(12) United States Patent
Nimura

(10) Patent No.: US 6,844,955 B2
(45) Date of Patent: Jan. 18, 2005

(54) ELECTRO-OPTICAL DEVICE, ELECTRONIC APPARATUS, AND METHOD FOR MANUFACTURING ELECTRO-OPTICAL DEVICE

(75) Inventor: Toru Nimura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 10/158,800

(22) Filed: Jun. 3, 2002

(65) Prior Publication Data

US 2002/0196517 A1 Dec. 26, 2002

(30) Foreign Application Priority Data

Jun. 5, 2001 (JP) ........................................ 2001-170173
May 16, 2002 (JP) ........................................ 2002-142134

(51) Int. Cl.$^7$ ............................... G02F 1/03; G02F 1/07
(52) U.S. Cl. ........................ 359/245; 359/247; 359/253; 359/254
(58) Field of Search ................................ 359/245, 247, 359/263, 253, 250, 252, 254, 255, 315, 316, 318; 349/24, 113, 110, 106, 111

(56) References Cited

U.S. PATENT DOCUMENTS

| | | | | |
|---|---|---|---|---|
| 5,847,789 A | * | 12/1998 | Nakamura et al. | ............ 349/99 |
| 6,103,558 A | * | 8/2000 | Yamanaka et al. | .......... 438/166 |
| 6,215,538 B1 | * | 4/2001 | Narutaki et al. | ............ 349/106 |
| 6,330,047 B1 | * | 12/2001 | Kubo et al. | .................. 349/147 |
| 6,624,860 B1 | * | 9/2003 | Narutaki et al. | ............ 349/106 |
| 6,671,025 B1 | * | 12/2003 | Ikeda et al. | .................. 349/156 |

FOREIGN PATENT DOCUMENTS

| | | |
|---|---|---|
| JP | A-8-255981 | 10/1996 |
| JP | A-9-101510 | 4/1997 |
| JP | A-2000-338524 | 12/2000 |
| JP | A-2003-5173 | 1/2003 |

* cited by examiner

Primary Examiner—Jordan M. Schwartz
Assistant Examiner—Jessica Stultz
(74) Attorney, Agent, or Firm—Oliff & Berridge, PLC

(57) ABSTRACT

The invention provides an electro-optical device, an electronic apparatus using the electro-optical device, and a method for manufacturing an electro-optical device. High-quality image display may be realized by avoiding abnormal exposures during formation of a photosensitive resin layer on a transparent substrate by using photolithography. A TFT-arrayed substrate of a reflective or transflective electro-optical device is manufactured in such a manner that a photosensitive resin is exposed from the front face side of the TFT-arrayed substrate after the photosensitive resin is applied, while the TFT-arrayed substrate is held at the rear face side thereof by a vacuum chuck. In this case, since a light-shielding film is formed at the lower side of a photosensitive resin layer, a risk in that light transmitted through the TFT-arrayed substrate is reflected by the vacuum chuck and thereby transfers marks and the like of suction holes to the photosensitive resin can be reduced or avoided.

19 Claims, 16 Drawing Sheets

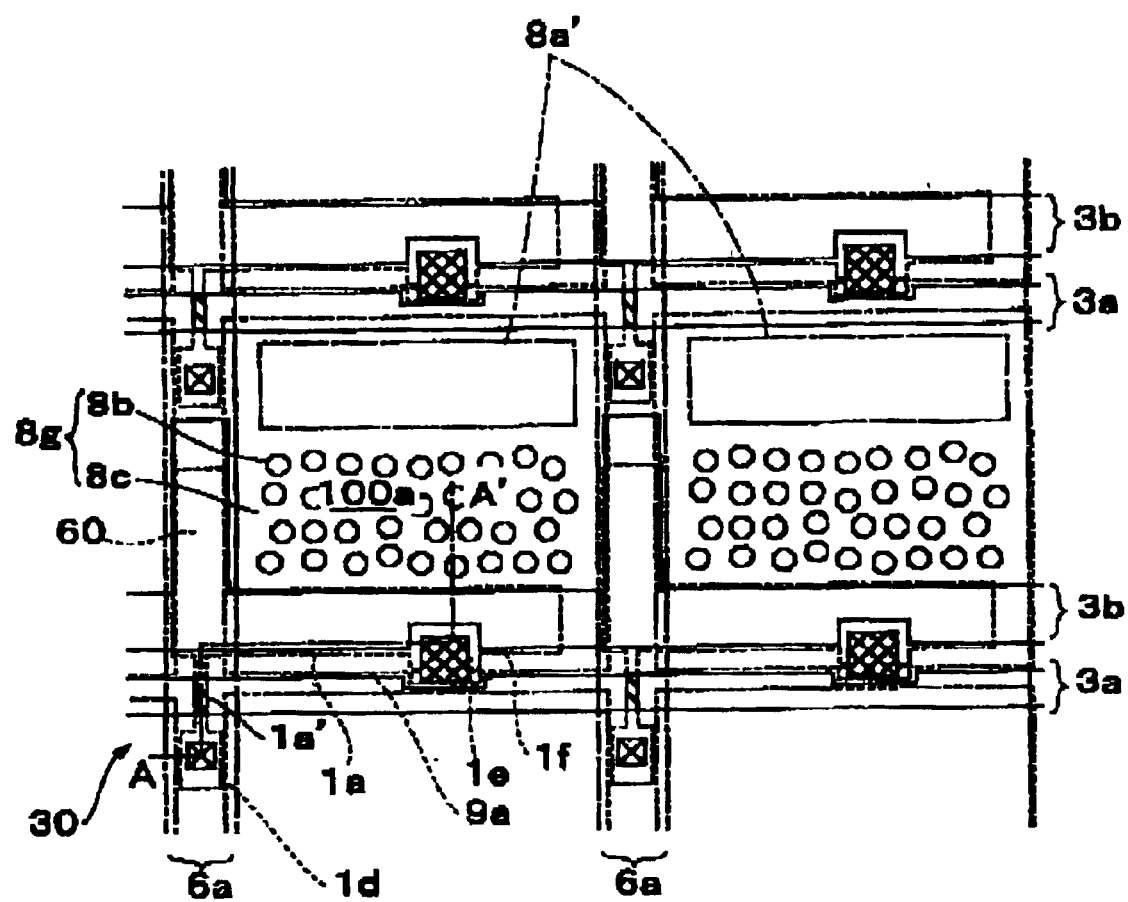

FIG. 11
TFT-FORMED REGION     LIGHT-REFLECTING-FILM-FORMED REGION
(A)
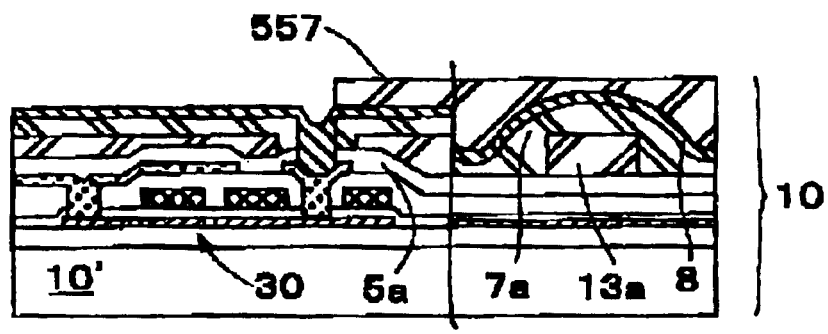
(B)
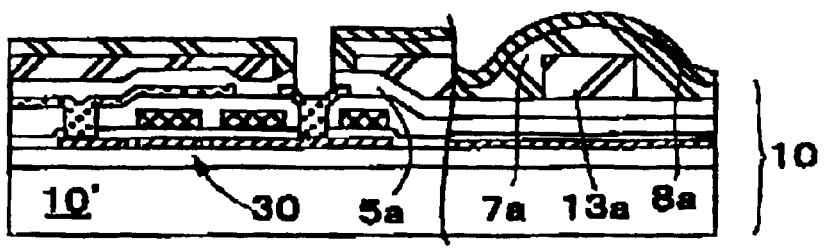
(C)
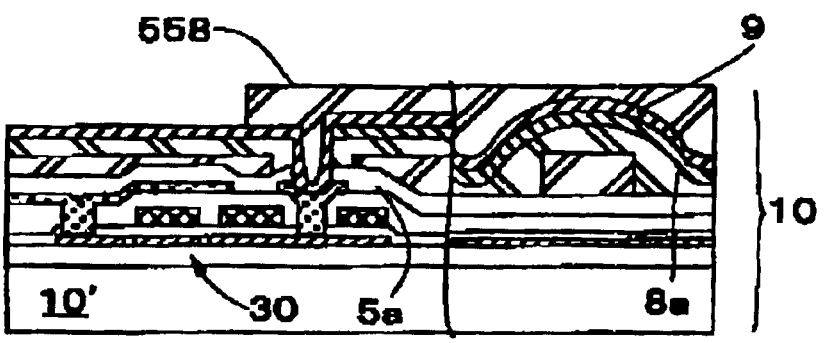
(D)
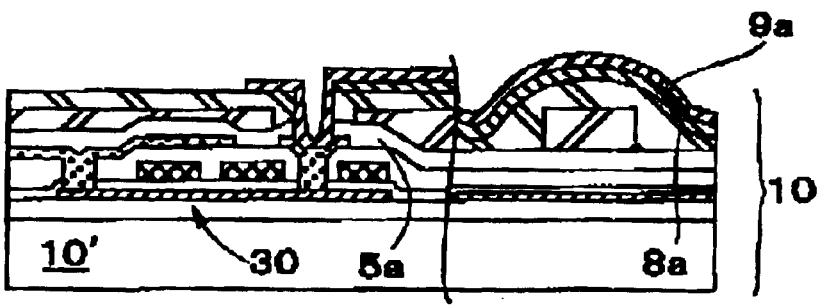

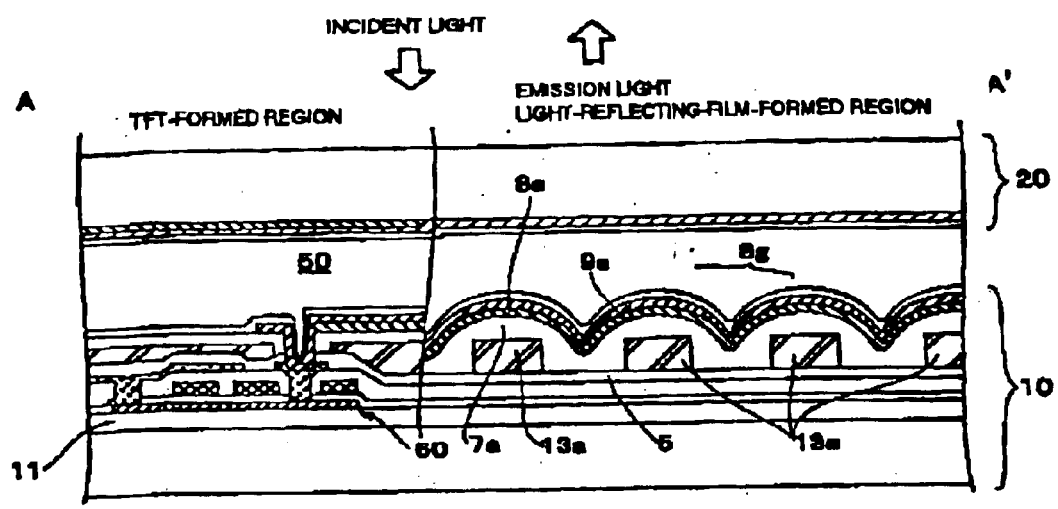
Related Art

ELECTRO-OPTICAL DEVICE, ELECTRONIC APPARATUS, AND METHOD FOR MANUFACTURING ELECTRO-OPTICAL DEVICE

BACKGROUND OF THE INVENTION

1. Field of Invention

The present invention relates to electro-optical devices including an electro-optical material held by transparent substrates, electronic apparatuses using the electro-optical devices, and a method for manufacturing the electro-optical devices. In particular, the present invention relates to forming a predetermined pattern with a photosensitive resin for the electro-optical device.

2. Description of Related Art

Electro-optical devices, such as liquid crystal devices, have been used as direct-view-type displays for various apparatuses. An active-matrix liquid crystal device is an example of such electro-optical devices, and includes, as shown in FIG. 20, a TFT-arrayed substrate 10 and an opposing substrate 20 opposing each other by being bonded to each other via a sealer (not shown), and liquid crystal 50 as an electro-optical material held between the substrates in a region defined by the sealer.

A technology concerning transflective liquid crystal devices is disclosed in, for example, Japanese Patent Application No. 2001-190293.

Generally, in a reflective or transflective liquid crystal device, a light-reflecting film 8a, for reflecting outside light incident from the opposing substrate 20 side toward the opposing substrate 20, is provided on the surface of the TFT-arrayed substrate 10 and at the lower side of pixel electrodes 9a. The light incident from the side of the opposing substrate 20 is reflected at the TFT-arrayed substrate 10 side, and images are displayed by using the light emitted from the opposing substrate 20.

In such a reflective or transflective liquid crystal panel, when the light reflected at the light-reflecting film 8a has strong directionality, a field-angle-dependency effect, where the brightness differs depending on the viewing angle for images or the like, becomes noticeable. Therefore, when the liquid crystal device is manufactured, a projection-recess pattern 8g has been formed on the surface of the light-reflecting film 8a provided at an upper side of a projection-recess-forming resin layer 13a which is formed by patterning a photosensitive resin 13 by photolithography so as to form a given pattern with the projection-recess-forming resin layer 13a are selectively and partly left without being removed, as shown in FIGS. 20 and 21(B), in a region at the lower side of the light-reflecting film 8a and overlapping the light-reflecting film 8a after the photosensitive resin 13, such as an acrylic resin, is applied rather thick to a surface of a second interlayer insulation film 5 (surface-protective film), as shown in FIG. 21(A). A fluid material 7, such as a polysilazane or an acrylic resin, is applied to the upper surface of the projection-recess-forming resin layer 13a, as shown in FIG. 21(C), and an upper insulation film 7a is patterned such that edges and the like of the projection-recess-forming resin layer 13a are not exposed at the projection-recess pattern 8g, as shown in FIGS. 20 and 21(D), or the projection-recess-forming resin layer 13a is smoothed to some extent by baking after the projection-recess-forming resin layer 13a is formed, instead of forming an upper insulation film.

In such a manufacturing method, in order to form the projection-recess-forming resin layer 13a of the photosensitive resin 13 applied to the overall substrate, as shown in FIG. 21(A), ultraviolet (UV) rays or the like are applied to a front face of the TFT-arrayed substrate 10 via an exposure mask 510, then, development is performed while, for example, the TFT-arrayed substrate 10 is adsorbed and held at a rear face thereof by a vacuum chuck 500. The vacuum chuck 500 is provided with numerous suction holes 501. The TFT-arrayed substrate 10 is adsorbed at the suction holes 501 by evacuating the vacuum chuck 500.

SUMMARY OF THE INVENTION

However, when the projection-recess-forming resin layer 13a is formed of the photosensitive resin 13 by the method discussed above, there is a risk, for example, in that the photosensitive resin 13 cannot be exposed and developed exactly according to the exposure mask 510 and, for example, a pattern other than the pattern according to the exposure mask 510 is transferred to the projection-recess-forming resin layer 13a. For example, when the photosensitive resin 13 is exposed, the light transmitted through the TFT-arrayed substrate 10 is reflected by the vacuum chuck 500 and is applied to the photosensitive resin 13a from the lower side thereof, and there is a risk in that marks of the suction holes 501 can be transferred to the projection-recess-forming resin layer 13a. Such an abnormal exposure directly affects the shape of the projection-recess pattern 8g formed on the surface of the light-reflecting film 8a, which unfavorably causes non-uniformity of the shape of the projection-recess pattern 8g between pixels, thereby deteriorating the quality of display.

Accordingly, the present invention provides an electro-optical device and an electronic apparatus using the electro-optical device, in which display of high-quality images can be realized by avoiding abnormal exposures during formation of a photosensitive resin layer on a transparent substrate by using photolithography. The invention also provides a method for manufacturing an electro-optical device.

Thus, according to the present invention, an electro-optical device includes a transparent substrate that holds an electro optical material. The transparent substrate includes a photosensitive resin layer which defines projections and recesses formed in a predetermined disposition pattern. The transparent substrate also includes a light-reflecting film which is formed at an upper side of the photosensitive resin layer and in a region planarly overlapping the photosensitive resin layer, the light-reflecting film being provided at a surface thereof with projections and recesses corresponding to the disposition pattern of the photosensitive resin layer. The transparent substrate also includes a light-shielding film at a lower side of the photosensitive resin layer and in a region planarly overlapping at least the region of the photosensitive resin layer in which the projections and recesses are formed.

According to the present invention, a method is provided for manufacturing an electro-optical device which includes a transparent substrate that holds an electro-optical material, the transparent substrate including a photosensitive resin layer which defines projections and recesses formed in a predetermined disposition pattern, the transparent substrate also including a light-reflecting film which is formed at an upper side of the photosensitive resin layer and in a region planarly overlapping the photosensitive resin layer, the light-reflecting film being provided on a surface thereof with projections and recesses corresponding to the disposition pattern of the photosensitive resin layer. The method includes: forming a light-shielding film in a predetermined region at a lower side of the photosensitive resin layer before forming the photosensitive resin layer on the transparent substrate; and forming the photosensitive resin layer on the transparent substrate by applying a photosensitive resin to the transparent substrate at a front face thereof, then, exposing the photosensitive resin from the front face of the transparent substrate while holding the transparent substrate with a substrate holder at a rear face of the transparent substrate.

In the method for manufacturing an electro-optical device, the substrate holder may hold the transparent substrate at a region disposed at the rear face thereof, in which the light-shielding film is formed and which is shielded from light by an exposure mask.

The substrate holder may include a vacuum chuck which is provided with suction holes to adsorb the transparent substrate at the rear face thereof.

According to the present invention, in order to form a photosensitive resin layer on a transparent substrate, the photosensitive resin is exposed from the front face of the transparent substrate while the transparent substrate is held at the rear face thereof by a substrate holder, after the transparent substrate is coated at the front face thereof with a photosensitive resin, then, development is performed. In this case, the transparent substrate is provided with a light-shielding film formed at the lower side of the photosensitive resin layer. Therefore, a risk in that light transmitted through the transparent substrate is reflected by the substrate holder and transfers marks or the like of the substrate holder to the photosensitive resin when the photosensitive resin is exposed is avoided, whereby the photosensitive resin layer can be formed accurately. Therefore, since the shape of a projection-recess pattern formed on a surface of a light-reflecting film is controlled accurately, high-quality display can be performed.

According to the present invention, the light-shielding film is preferably formed substantially over the entire region which planarly overlaps the region in which the light-reflecting film is formed. With this arrangement, the difference of light reflection between the region provided with the light-shielding film and the region not provided with the light-shielding film does not affect the result of the exposure.

According to the present invention, when the transparent substrate is provided with pixels arrayed in a matrix, and each pixel includes a thin-film element formed with a plurality of thin-film layers and a transparent pixel electrode electrically connected to the thin film element, the light-shielding film is preferably formed at the same level as one of the plurality of thin-film layers. With this arrangement, the light-shielding film can be simultaneously formed by using the forming process for the thin-film element, because the thin-film element is formed on the transparent substrate by performing thin-film deposition and patterning a plurality of times. Therefore, additional processes are not necessarily required to form additional light-shielding films on the transparent substrate.

For example, when the thin-film element includes a thin-film transistor formed on the transparent substrate, the light-shielding film is preferably formed at the same level as one of a semiconductor film formed at the same level as an active layer of the thin-film transistor, a conductive film formed at the same level as a gate electrode of the thin-film transistor, and another conductive film formed at the same level as a source electrode of the thin-film transistor. When the light-shielding film is formed at the same level as one of the semiconductor film formed at the same level as an active layer of the thin-film transistor, the conductive film formed at the same level as a gate electrode of the thin-film transistor, and the other conductive film formed at the same level as a source electrode of the thin-film transistor, the thin film element and the one conductive film are preferably separated electrically from each other. The light-shielding film may be formed integrally with one of the semiconductor film formed at the same level as an active layer of the thin-film transistor, the conductive film formed at the same level as a gate electrode of the thin-film transistor, and the other conductive film formed at the same level as a source electrode of the thin-film transistor, when there is no risk of forming stray capacitance with the conductive films or a short circuit.

When the thin-film element includes a storage capacitor formed on the transparent substrate, the light-shielding film may be formed with a conductive film disposed at the same level as one of a lower electrode and an upper electrode of the storage capacitor. In this case, the lower electrode or the upper electrode of the storage capacitor and the conductive film as a light-shielding film are preferably separated electrically from each other. However, the light-shielding film may be formed integrally with the lower electrode or the upper electrode of the storage capacitor when there is no risk of forming stray capacitance with the conductive films or a short circuit.

According to the present invention, when a primary protective-film is formed on the transparent substrate at a lower side of the in-film element, the light-shielding film may be formed at a lower side of the primary protective-film.

According to the present invention, the light-shielding film may be electrically separated from the pixel electrode.

When the light-shielding film that is included in each pixel is formed independently from the light-shielding films included in the other pixels, the light-shielding film may be electrically connected to the pixel electrode in each pixel.

According to the present invention, when each pixel that is formed on the transparent substrate is provided with a reflection region, in which light incident from a front face side of the transparent substrate is reflected by the light-reflecting film, and a transmission region, in which the light incident from a rear face side of the transparent substrate is transmitted to the front face side thereof, the light-shielding film is preferably formed in the reflection region.

According to the present invention, the electro-optical material includes, for example, liquid crystal. In this case, the transparent substrate may include a first transparent substrate, and a second transparent substrate that opposes the first transparent substrate, and the liquid crystal as an electro-optical material is held between the first and second transparent substrates.

An electro-optical device according to the present invention can be used as a display or the like of an electronic apparatus, such as a cellular phone or a mobile computer.

BRIEF DESCRIPTION OF THE DRAWINGS

FIG. 4 is a plan view of each pixel formed on a TFT-arrayed substrate of the electro-optical device according to a first embodiment of the present invention;

FIGS. 11(A) to 11(D) are sectional views showing the steps which follow the steps shown in FIGS. 10(A) to 10(D) of the method for manufacturing the TFT-arrayed substrate of the electro-optical device according to the first embodiment of the present invention;

FIG. 20 is a sectional view of a part of a pixel of a known electro-optical device;

DETAILED DESCRIPTION OF PREFERRED EMBODIMENTS

Embodiments according to the present invention are described below with reference to the drawings.

First Embodiment (Basic Configuration of Electro-optical Device)

Figure 1:
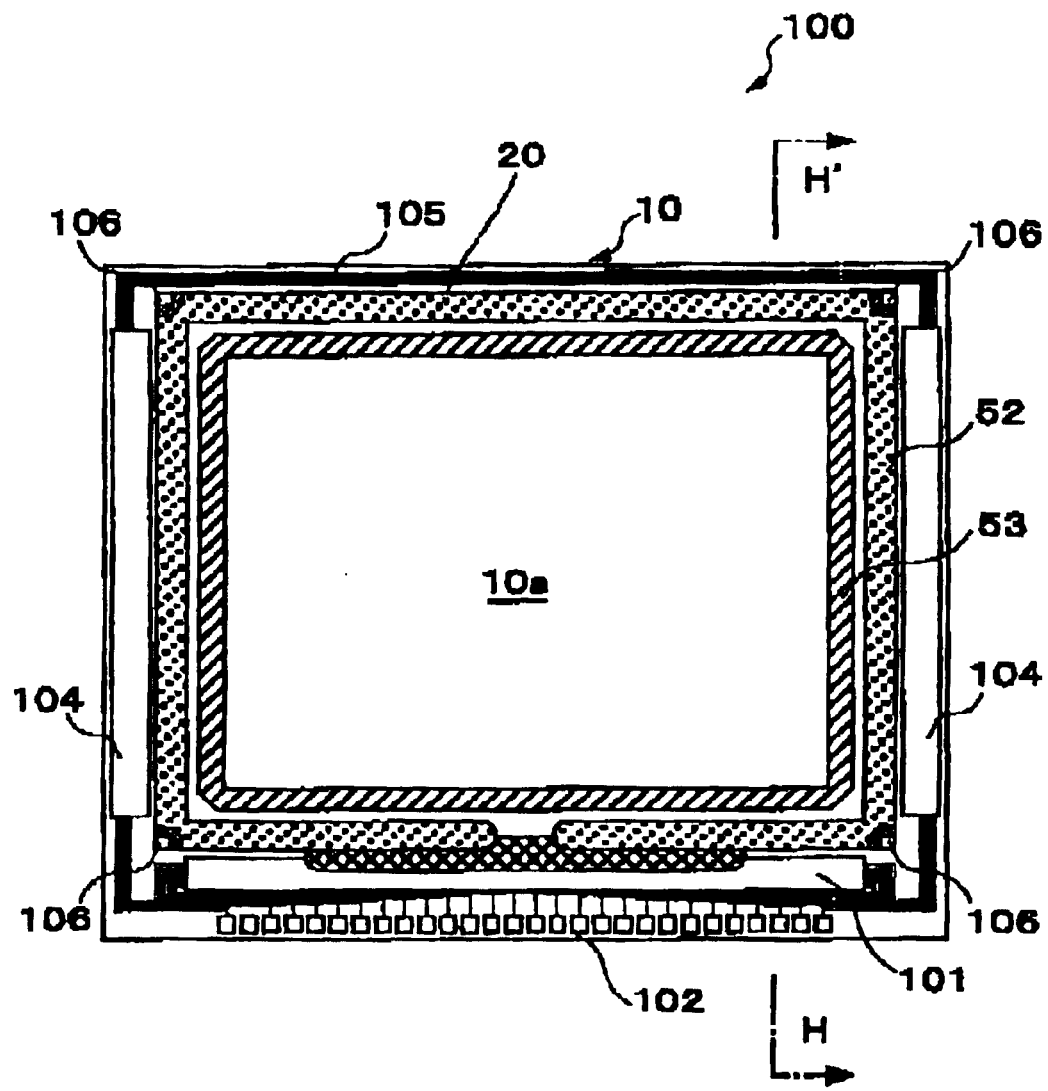
FIG. 1 is a plan view from the side of an opposing substrate of an electro-optical device.
Figure 2:
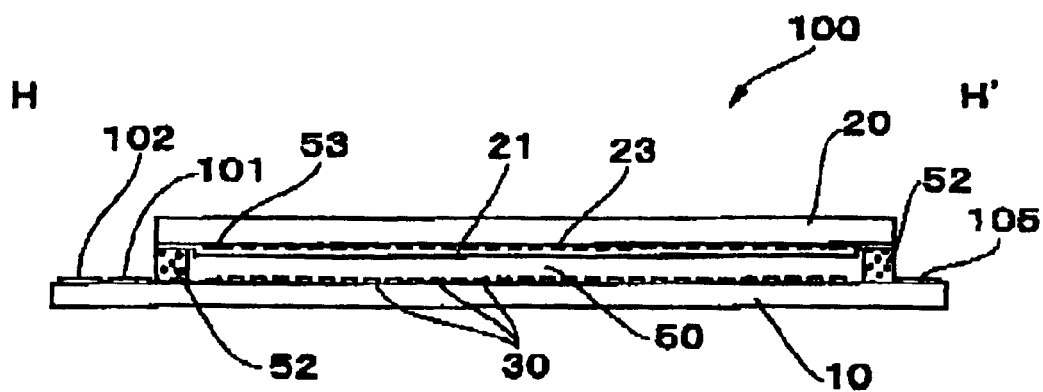
FIG. 2 is a sectional view taken along plane H–H' of the electro-optical device shown in FIG. 1.
Figure 3:
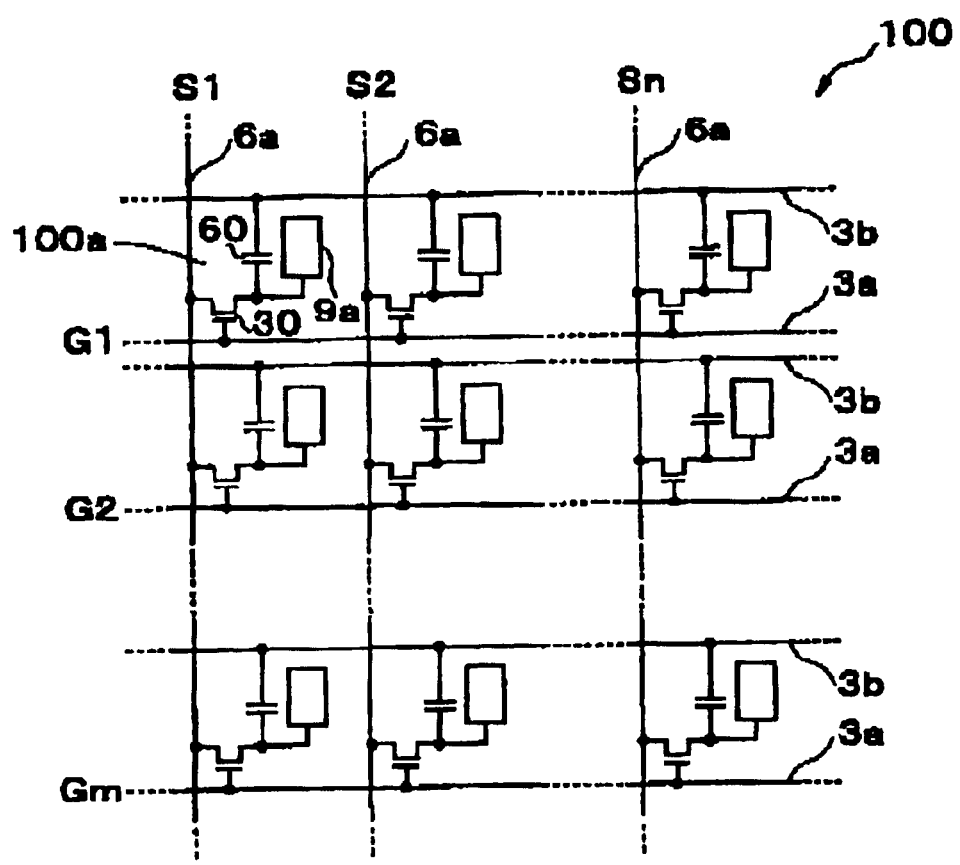
FIG. 3 is a schematic of an equivalent circuit including various elements, wirings, and the like disposed at a plurality of pixels formed in a matrix in the electro-optical device.

FIG. 1 is a plan view of an electro-optical device and components thereof, according to the present invention, from an opposing substrate side of the electro-optical device. FIG. 2 is a sectional view taken along plane H–H' of the electro-optical device shown in FIG. 1. FIG. 3 is a schematic of an equivalent circuit including various elements, wirings, and the like disposed in a plurality of pixels formed in a matrix in an image-display region of the electro-optical device. In the drawings used for description of the present embodiment, the scales of the layers and component parts differ from each other so that the size of each drawn layer or component part is such that the layers and components can be recognized in the drawings. In other words, the layers and component parts are not drawn to scale in the figures.

In FIGS. 1 and 2, an electro-optical device 100 according to the present embodiment includes a TFT-arrayed substrate 10 (first substrate) and an opposing substrate 20 (second substrate) bonded to each other via a sealer 52, and liquid crystal 50 as an electro-optical material held in a region (liquid-crystal-sealing region) defined by the sealer 52. A peripheral delimiter 53 made of a light-shielding material is provided at the inner side of the region provided with the sealer 52. A data-line driving circuit 101 and mounting terminals 102 are provided at the outer side of the sealer 52 and along one side of the TFT-arrayed substrate 10. Scan-line-driving circuits 104 are individually provided along two sides adjacent to the one side of the TFT-arrayed substrate 10. A plurality of wirings 105 to interconnect the scan-line-driving circuits 104 provided at two sides of an image-display region is provided at the remaining side of the TFT-arrayed substrate 10. A pre-charge circuit or an inspection circuit may be provided, for example, under the peripheral delimiter 53. An inter-substrate conductor 106, for electrically conduction between the TFT-arrayed substrate 10 and the opposing substrate 20, is formed at at least one of the corners of the opposing substrate 20.

Instead of forming the data-line-driving circuit 101 and the scan-line driving circuits 104 on the TFT-arrayed substrate 10, for example, a TAB (tape automated bonding) substrate mounted with driving LSIs may be electrically and mechanically connected to terminals formed around the TFT-arrayed substrate 10 via an anisotropically conductive membrane. The electro-optical device 100 is provided with a polarizing film, a retarder film, a polarization plate, and the like are each disposed in a predetermined direction according to the type of the liquid crystal 50, that is, the operational modes, such as a TN (twisted nematic) mode and a STN (super TN) mode, a normally white mode, and a normally black mode. These components are omitted from the drawings.

When the electro-optical device 100 is arranged for color display, RGB-color filters are provided together with protection films therefor in regions of the opposing substrate 20, which individually oppose pixel electrodes (described below) formed on the TFT-arrayed substrate 10.

In an image-display region 10a of the electro-optical device 100 thus formed, a plurality of pixels 100a are disposed in a matrix, as shown in FIG. 3. Each pixel 100a includes a pixel electrode 9a and a pixel-switching TFT 30 to drive the pixel electrode 9a. Data lines 6a to supply pixel signals S1, S2, ..., and Sn are each electrically connected to the source of each TFT 30. The pixel signals S1, S2, ..., and Sn may be supplied in this order to be written to the respective consecutive data lines 6a, or may be supplied to each group of a plurality of the data lines 6a adjacent to each other. The gate of each TFT 30 is electrically connected to a scan line 3a. Scan signals G1, G2, ..., and Gm are applied in pulse in this order to the respective consecutive scan lines 3a at given timing. Each pixel electrode 9a is electrically connected to the drain of the TFT 30. The pixel signals S1, S2, ..., and Sn supplied from the data lines 6a are written to the respective pixels at a given timing with the TFTs 30, which are switching elements, being switched on for a given period. The pixel signals S1, S2, ..., and Sn each having a given level which were written to the liquid crystal via the pixel electrodes 9a are retained for a predetermined period between the pixel electrodes 9a and an opposing electrode 21.

Orientation and order in the molecular assembly of the liquid crystal 50 vary in accordance with the voltage level applied thereto, whereby light is modulated and display in gradation is made possible. In a normally white mode, as the voltage applied to a part of the liquid crystal 50 increases, the amount of incident light transmitted through the part of the liquid crystal 50 decreases. In a normally black mode, as the voltage applied to a part of the liquid crystal 50 increases, the amount of incident light transmitted through the part of the liquid crystal 50 increases. As a result, light having contrast corresponding to the pixel signals S1, S2, ..., and Sn is emitted from the overall electro-optical device 100.

In order to prevent the retained pixel signals S1, S2, ..., and Sn from leaking, storage capacitors 60 can be provided in parallel to the capacitance of the liquid crystal between the respective pixel electrodes 9a and the opposing electrode. For example, the voltage at the pixel electrodes 9a is maintained by the storage capacitor 60 for a period three-figure times the period for which the source voltage is applied. With this arrangement, the retention of charge is increased, and a electro-optical device 100 that is capable of forming high contrast images can be thereby realized. The storage capacitors 60 may be formed so as to be connected either to capacitor lines 3b which are wirings for the storage capacitors 60, as shown in FIG. 3, or to the scan lines 3a described above.

(Configuration of TFT-arrayed Substrate)

Figure 5A:
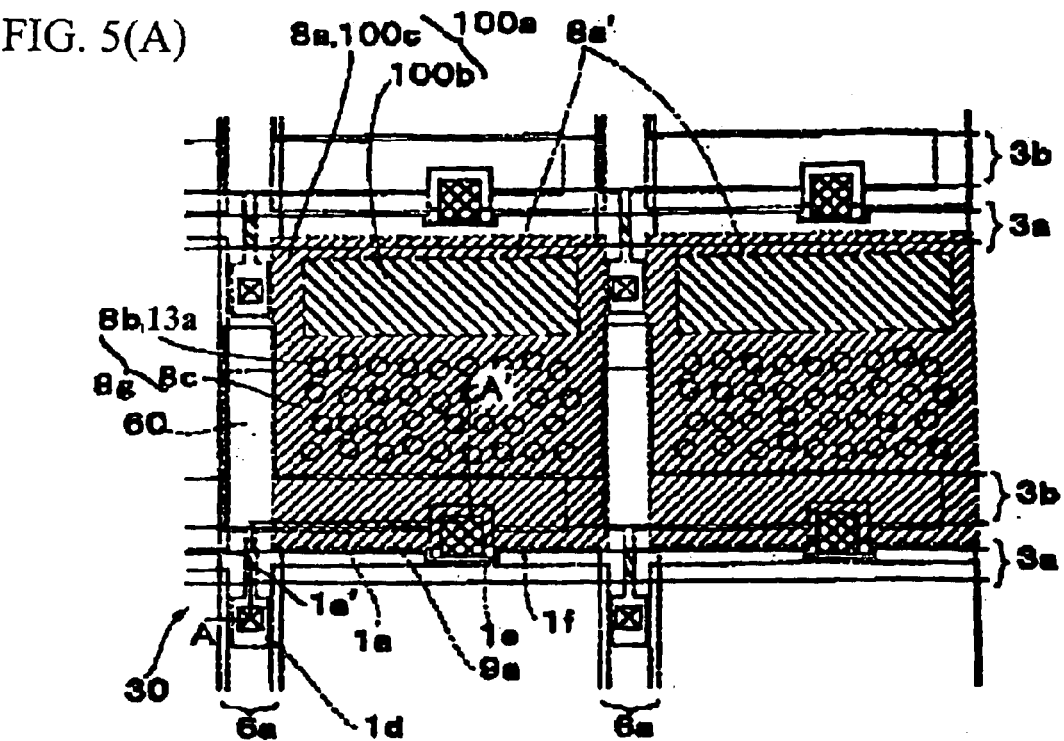
FIGS. 5(A) and 5(B) are plan views showing regions of each pixel provided on a TFT-arrayed substrate of the electro-optical device shown in FIG. 4, in which a light-reflecting film and a light-shielding film, respectively, are formed.
Figure 5B:
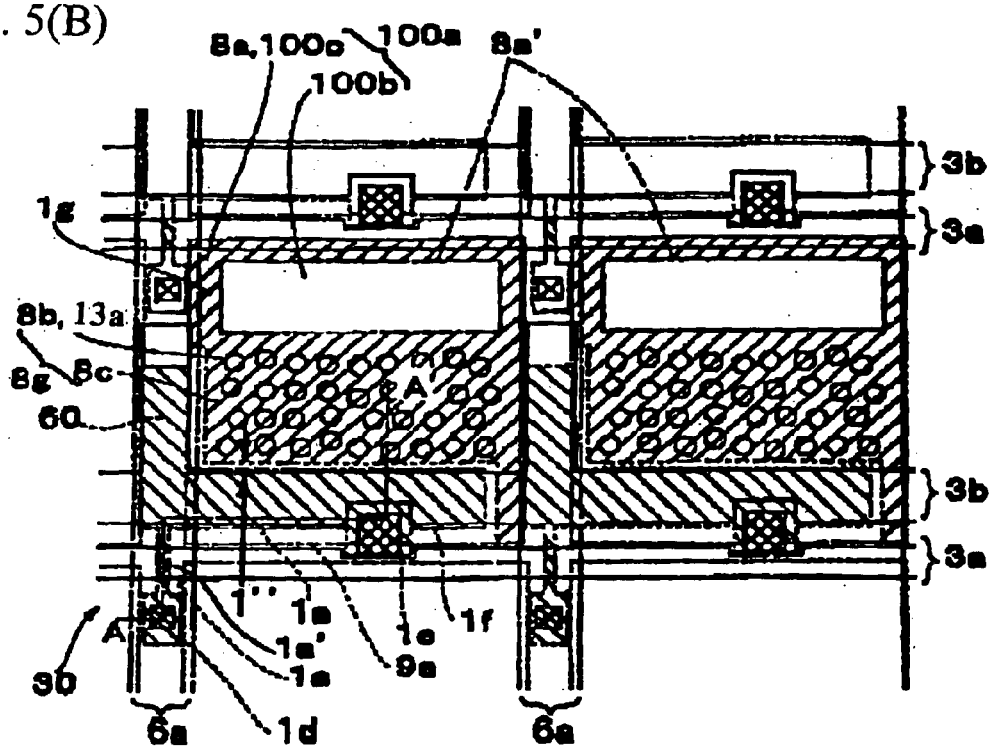
Figure 6:
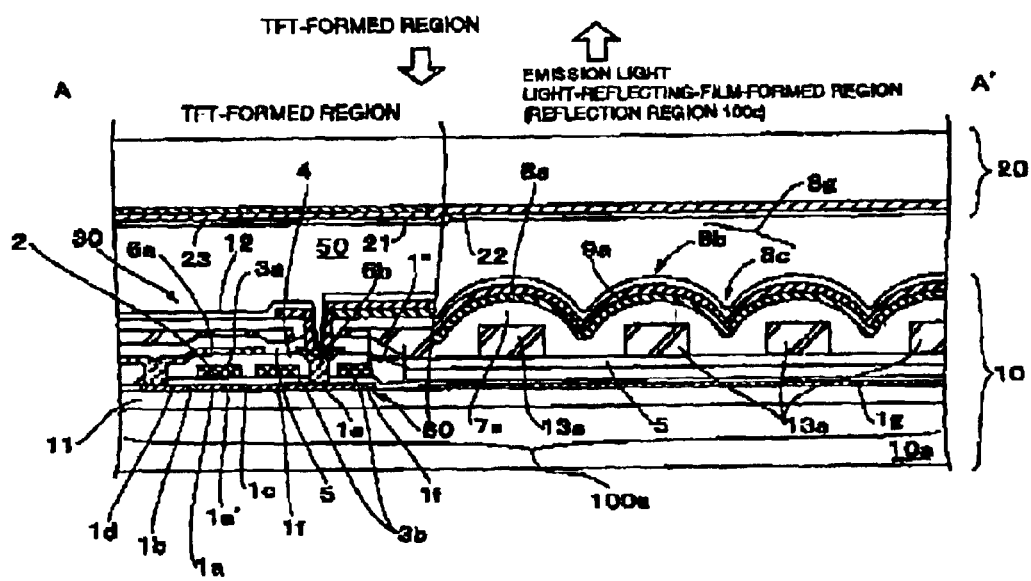
FIG. 6 is a sectional view taken along plane A–A' of a part of the electro-optical device shown in FIG. 4.
Figure 7:
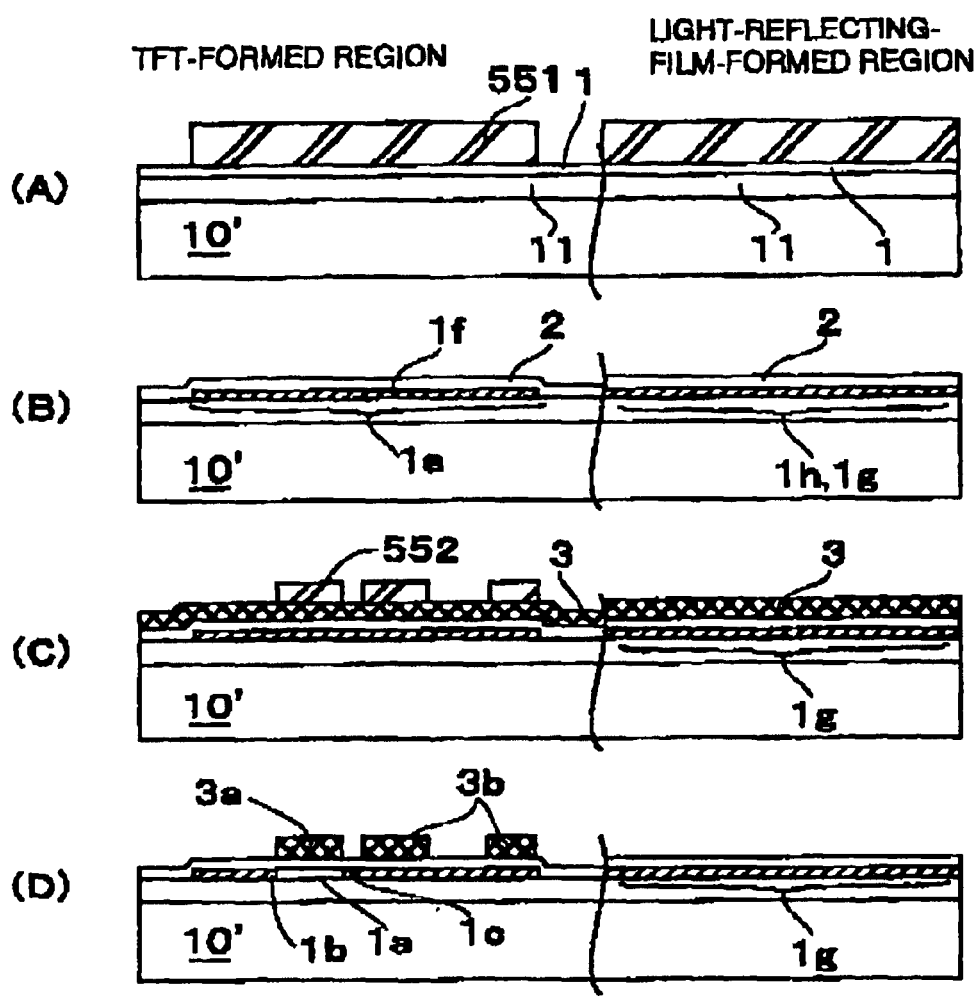
FIGS. 7(A) to 7(D) are sectional views showing the steps of a method for manufacturing the TFT-arrayed substrate of the electro-optical device according to the first embodiment of the present invention.
Figure 8:
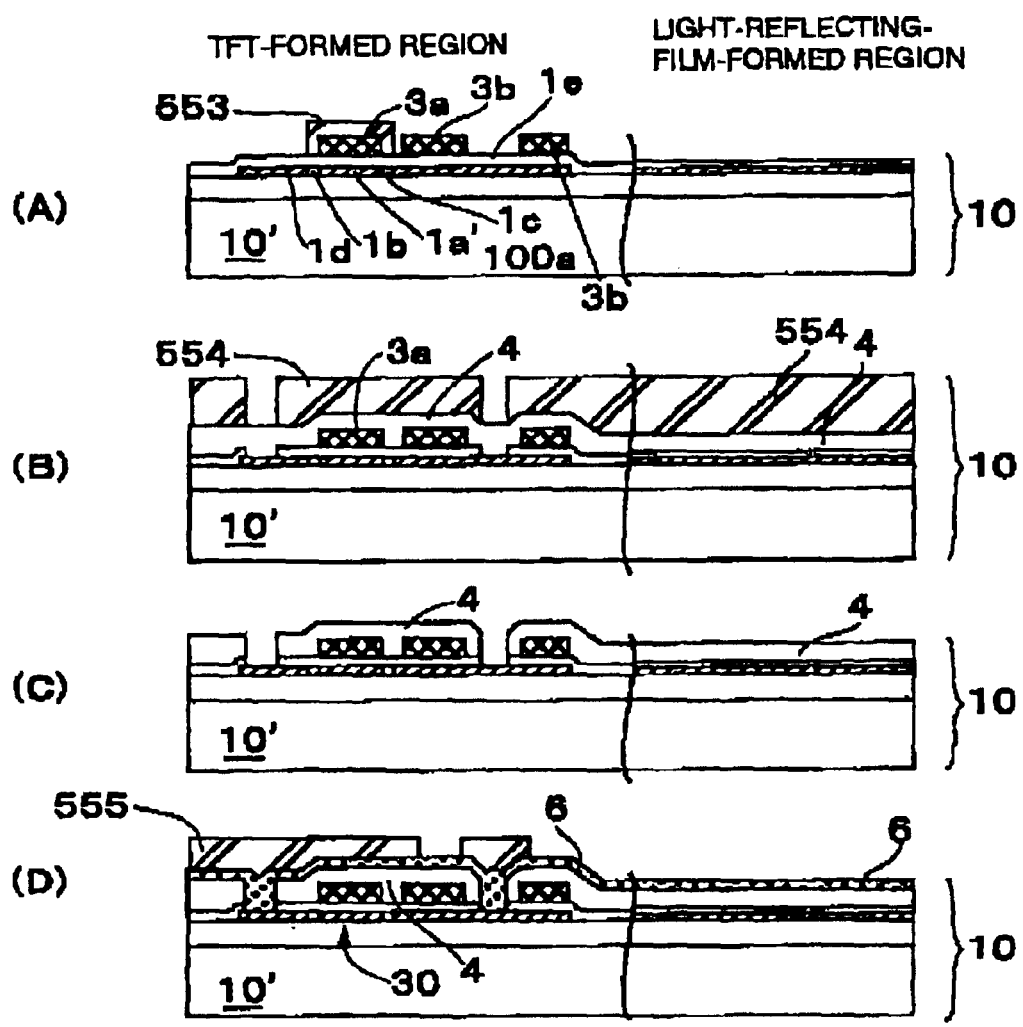
FIGS. 8(A) to 8(D) are sectional views showing the steps which follow the steps shown in FIGS. 7(A) to 7(D) of the method for manufacturing the TFT-arrayed substrate of the electro-optical device according to the first embodiment of the present invention.
Figure 9:
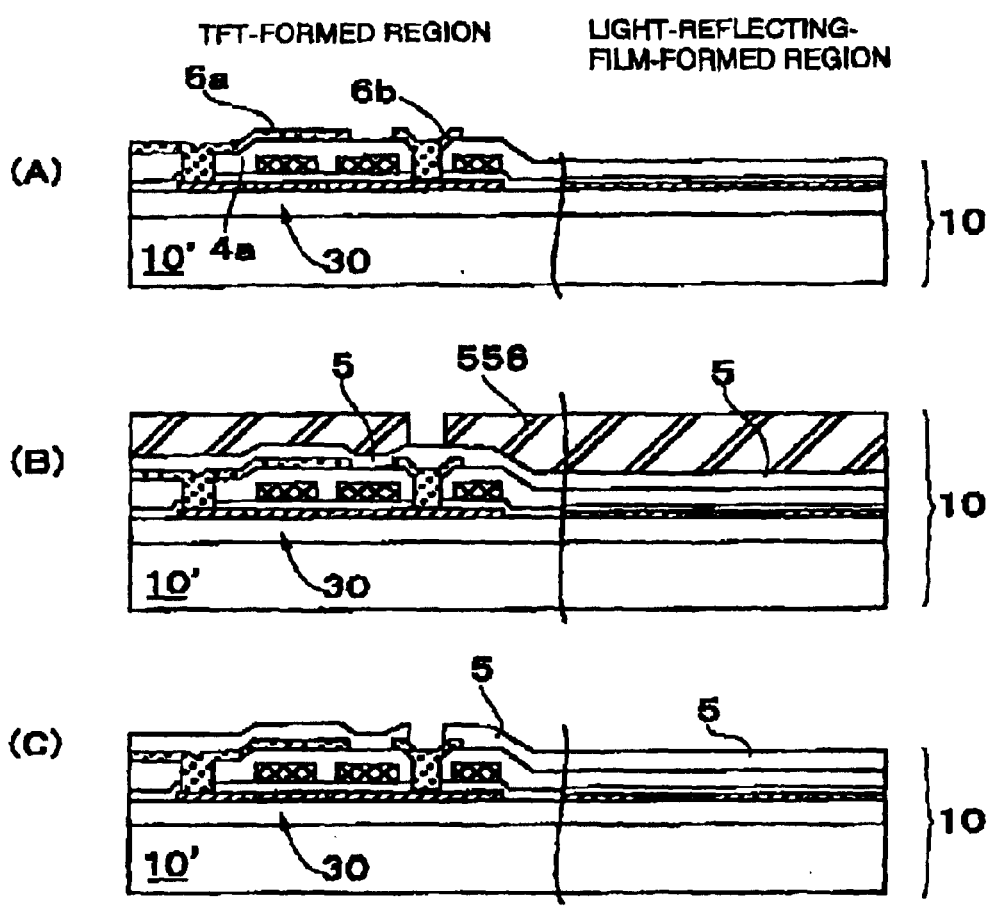
FIGS. 9(A) to 9(C) are sectional views showing the steps which follow the steps shown in FIGS. 8(A) to 8(D) of the method for manufacturing the TFT-arrayed substrate of the electro-optical device according to the first embodiment of the present invention.
Figure 10:
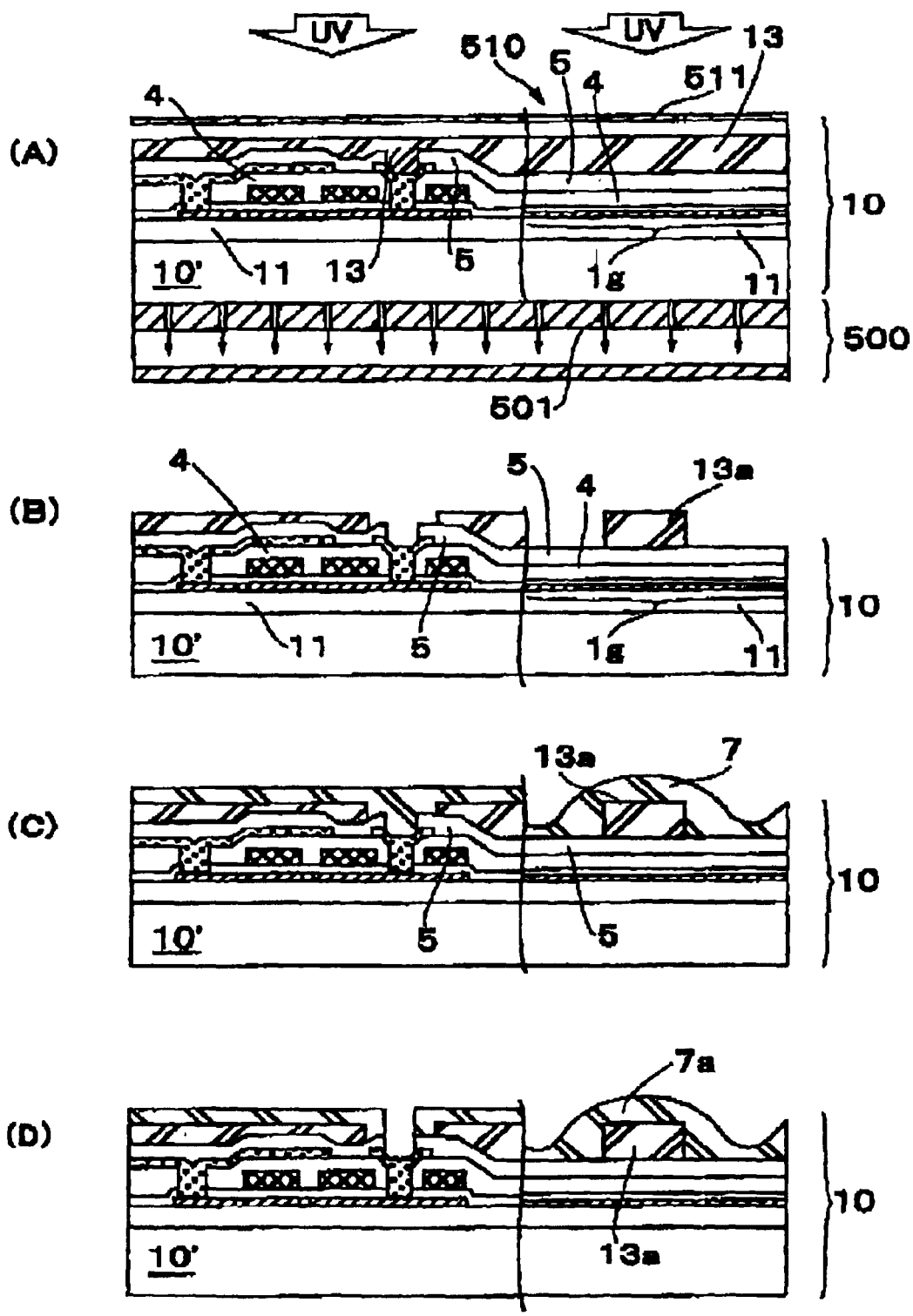
FIGS. 10(A) to 10(D) are sectional views showing the steps which follow the steps shown in FIGS. 9(A) to 9(C) of the method for manufacturing the TFT-arrayed substrate of the electro-optical device according to the first embodiment of the present invention.

FIG. 4 is a plan view of a plurality of the pixels adjacent to each other formed on the TFT-arrayed substrate used for the electro-optical device according to the present embodiment. FIGS. 5(A) and 5(B) are plan views showing regions in which light-reflecting films for the pixels are formed, and regions in which light-shielding films for the pixels are formed, respectively, on the TFT-arrayed substrate of the electro-optical device according to the present embodiment. FIG. 6 is a sectional view taken along plane A–A' of a part of the pixel of the electro-optical device shown in FIG. 4.

In FIG. 4, the TFT-arrayed substrate 10 is provided thereon with a plurality of the pixel electrodes 9a formed in a matrix, the pixel electrodes 9a being made of an ITO (indium tin oxide) film. The pixel-switching TFTs 30 are individually connected to the pixel electrodes 9a. The data lines 6a, the scan lines 3a, and the capacitor lines 3b are disposed along the vertical and horizontal boundaries of the pixel electrodes 9a. Each TFT 30 is connected to the data line 6a and the scan line 3a. That is, the data line 6a is electrically connected to a heavily-doped source region 1d of the TFT 30 via a contact hole. The pixel electrode 9a is electrically connected to a heavily-doped drain region 1e of the TFT 30 via another contact hole. Each scan line 3a extends so as to oppose a channel region 1a' of the TFT 30. The storage capacitor 60 (storage capacitance element) is formed with an electrically conductive extending part 1f, as a lower electrode, of a semiconductor film 1 to form the pixel-switching TFT 30 and the capacitor line 3b, as an upper electrode, disposed on the same level as the scan line 3a, the extending part 1f and the capacitor line 3b overlapping each other.

In each pixel 100a thus arranged, a part of the region of the pixel electrodes 9a hatched down to the right, shown in FIG. 5(A), is a transmission region 100b at which display is performed in a transmission mode, and a part of the region hatched down to the left, shown in FIG. 5(A), is a reflection region 100c at which display is performed in a reflection mode using a light-reflecting film described below.

Each pixel 100a thus arranged is formed with a primary protective-film 11a, which is a silicon oxide film (insulation film) having a thickness of 300 nm to 500 nm, applied to a surface of a transparent substrate 10' as a base substrate of the TFT-arrayed substrate 10, and an island-like semiconductor film 1a having a thickness of 50 nm to 100 nm applied to the surface of the primary protective-film 11a. The semiconductor film 1a is coated at the surface thereof with a gate-insulation film 2a having a thickness of approximately 50 to 150 nm, which is a silicon oxide film. The scan line 3a, as a gate electrode having a thickness of 300 nm to 800 nm, extends along the surface of the gate insulation film 2a. A region of the semiconductor film 1a, which opposes the scan line 3a via the gate-insulation film 2a serves as the channel region 1a'. The channel region 1a' is provided at one side thereof with a source region including a lightly-doped source region 1b and the heavily-doped source region 1d, and with a drain region including a lightly-doped drain region 1c and the heavily-doped drain region 1e at the other side of the channel region 1a'.

Each pixel-switching TFT 30 is provided at the front face side thereof with a first interlayer insulation film 4, which is a silicon oxide film having a thickness of 300 nm to 800 nm, and a second interlayer insulation film 5 (surface-protective film), which is a silicon nitride film having a thickness of 100 nm to 300 nm. The data line 6a which has a thickness of 300 nm to 800 nm is formed on the surface of the first interlayer insulation film 4. The data line 6a is electrically connected to the heavily-doped source region 1d via a contact hole formed in the first interlayer insulation film 4. The first interlayer insulation film 4 is provided on the surface thereof with drain electrodes 6b which are formed simultaneously with the data lines 6a. Each drain electrode 6b is electrically connected to the heavily-doped drain region 1e via a contact hole formed in the first interlayer insulation film 4.

The second interlayer insulation film 5 is coated thereon with an upper insulation film 7a made of a photosensitive resin, such as an acrylic resin. A light-reflecting film 8a is formed with an aluminum film or the like on the surface of the upper insulation film 7a.

Each transparent pixel electrode 9a which is made of an ITO film is formed on the light-reflecting film 8a. The pixel electrode 9a is directly deposited on the surface of the light-reflecting film 8a, and is electrically connected to the light-reflecting film 8a. The pixel electrode 9a is electrically connected to the drain electrode 6b via contact holes formed in the upper insulation film 7a and the second interlayer insulation film 5.

An orientation film 12, which is a polyimide film, is formed at the front face side of the pixel electrodes 9a. The orientation film 12 is a polyimide film processed by rubbing.

Each extending part 1f (lower electrode) continuing from the heavily-doped drain region 1e opposes the capacitor line 3b as an upper electrode disposed on the same level as the scan line 3a via an insulation film (dielectric film) formed simultaneously with the gate-insulation film 2a, thereby forming the storage capacitor 60.

Although each TFT 30 preferably has an LDD structure as described above, it may have an offset structure in which no impurity ion is implanted into a region corresponding to the lightly-doped source region 1b or the lightly-doped drain region 1c. The TFT 30 may be a self-alignment-type TFT in which impurity ions are heavily implanted with the gate electrode (a part of the scan line 3a) that is used as a mask, and a heavily-doped source and drain regions are formed in a self-aligned manner.

Although according to the present embodiment, each TFT 30 has a single gate structure in which one gate electrode (scan line 3a) is disposed between the source and drain regions, two gate electrodes or more may be disposed between these regions. In this case, the same signal must be supplied to each gate electrode. When the TFT 30 is formed with dual gates (double gates), triple gates, or more gates, current leakage from the connecting part between the channel region and the source-drain regions can be avoided, whereby the current in a switched-off state can be reduced. When at least one of the gate electrodes has an LDD structure or an offset structure, the current in a switched-off state can be further reduced, and a stable switching element is thereby obtainable.

(Configuration of Projection-recess Pattern)

As shown in FIG. 6, in the reflection region 100c of each pixel 100a of the TFT-arrayed substrate 10, the light-reflecting film 8a is provided with the projection-recess pattern 8g that includes projections 8b and the recesses 8c at the front face of the light-reflecting film 8a in a region thereof (a region in which the light-reflecting film is formed, as shown in FIG. 4) outside of the region in which the TFT 30 is provided.

In order to form the projection-recess pattern 8g, the TFT-arrayed substrate 10 according to the present embodiment is provided with a projection-recess-forming resin layer 13a made of a photosensitive resin, such as an acrylic resin that is formed rather thick on the surface of the second interlayer insulation film 5 in a region at the lower side of the light-reflecting film 8a and planarly overlapping the same, and the upper insulation film 7a, which is an insulation film made of a fluid material such as a polysilazane or acrylic resin formed on the projection-recess-forming resin layer 13a. Therefore, the light-reflecting film 8a is provided at the surface thereof with the projection-recess pattern 8g formed with the projections and recesses which are formed by the projection-recess-forming resin layer 13a. Edges and the like of the projection-recess-forming resin layer 13a are prevented from being exposed at the projection-recess pattern 8g by the upper insulation film 7a. Instead of forming the upper insulation film 7a, the projections and recesses may be made to be smooth by baking after the projection-recess-forming resin layer 13a.

(Configuration of Light-shielding Film)

In the reflection region 100c of each pixel 100a of the thus formed TFT-arrayed substrate 10, a light-shielding film 1g, which is a semiconductor film disposed on the same level as the semiconductor film 1a which forms an active layer of the TFT 30, is formed at least in a region disposed at the lower side of the projection-recess-forming resin layer 13a and planarly overlapping the region of the light-reflecting film 8a in which the projection-recess pattern is formed by the projection-recess-forming resin layer 13a (also see FIG. 5(B)). According to the present embodiment, the semiconductor 1a is formed substantially over the entire region which overlaps the light-reflecting film 8a. The light-shielding film 1g is a semiconductor film which is manufactured simultaneously with the semiconductor film 1a and has a light-blocking effect. The light-shielding film 1g is disposed on the same level as the extending part 1f (lower electrode) of the heavily-doped drain region 1e forming the storage capacitor 60.

The light-shielding film 1g is formed on the same level as the semiconductor film 1a which forms an active layer of the TFT 30, and the lower electrode of the storage capacitor 60. Although the light-shielding film 1g is electrically conductive because of the implanted impurity ions, these semiconductor films are electrically completely separated because gaps 1" are ensured between these semiconductor films, as shown in FIGS. 5(B) and 6. Therefore, the light-shielding film 1g does not interfere with the operation in each pixel 100a. When the light-shielding film 1g is formed so as to overlap other conductive films (such as the data line 6a), unnecessary capacitance is not formed.

(Configuration of Opposing Substrate)

In FIG. 6, so-called black-matrix or black-stripe light-shielding films 23 are provided on the opposing substrate 20 in regions thereof opposing the vertical and horizontal boundary regions of the pixel electrodes 9a formed on the TFT-arrayed substrate 10. The opposing electrode 21 that is made with an ITO film is disposed at the upper side of the light-shielding films 23. An orientation film 22 which is a polyimide film is formed at the upper side of the opposing electrode 21. The orientation film 22 is a polyimide film processed by rubbing.

(Operation of the Electro-optical Device According to the Embodiment)

The electro-optical device 100 is a reflective liquid crystal device, and is provided with the light-reflecting films 8a which are aluminum films or the like formed at the lower side of the pixel electrodes 9a. The light incident from the opposing substrate 20 side can be reflected at the TFT-arrayed substrate 10 side and be emitted from the opposing substrate 20 side. Therefore, desired images can be displayed by using outside light with the liquid crystal 50 modulating the light at each pixel 100a during the travel of the light in the electro-optical device 100 (reflection mode).

Since the light-reflecting films 8a are formed in regions other than regions 8' which are enclosed by two-dot-chain lines shown in FIG. 2, the electro-optical device 100 also functions as a transflective liquid crystal device. That is, the light emitted by a backlight device (not shown), which is disposed at the TFT-arrayed substrate 10 side, is applied to the TFT-arrayed substrate 10 side, and is transmitted toward the opposing substrate 20 through the transmission region 100b in which the pixel electrodes 9a of the pixels 100a are formed and the light-reflecting film 8a is not provided. Therefore, when the liquid crystal 50 modulates the light in each pixel 100a, desired images can be displayed by using the light emitted by a backlight device (transmission mode).

According to the present embodiment, the projection-recess-forming resin layer 13a is formed selectively in a desired pattern in a region disposed at the lower side of the light-reflecting film 8a and planarly overlapping the light-reflecting film 8a. The projection-recess pattern 8g is formed on the surface of the light-reflecting film 8a by using steps, projections, and recesses formed by the projection-recess-forming resin layer 13a. Edges and the like of the projection-recess-forming resin layer 13a are prevented from being exposed at the projection-recess pattern 8g by the upper insulation film 7a. When images are displayed in a reflection mode, and the incident light to the opposing substrate 20 is reflected at the light-reflecting films 8a, the light is scattered; therefore, a field-angle-dependency effect to the images is reduced.

Method of Manufacturing TFT

A method of manufacturing the above TFT-arrayed substrate 10 is described below with reference to FIGS. 7 to 11. FIGS. 7, 8, 9, 10, and 11 are sectional views showing the steps of the method of manufacturing the TFT-arrayed substrate 10 according to the present embodiment. Each of these figures shows sections of a region in which TFTs are formed and another region outside of the region provided with the TFT, in which the light-reflecting film (reflection region) and the projection-recess-forming resin layer are formed.

A substrate 10', shown in FIG. 7(A), that is made of glass or the like and cleaned by ultrasonic cleaning is firstly prepared. The primary protective-film 11, which is a silicon oxide film, is deposited on the entire substrate 10' by a thickness of 300 nm to 500 nm by plasma CVD at a temperature of the substrate of 150° C. to 450° C. In this step, a mixture of, for example, monosilane and laughing gas, TEOS and oxygen, or disilane and ammonia may be used as a source gas.

Secondly, the semiconductor film 1, which is an amorphous silicon film, is deposited on the entire substrate 10' by a thickness of 50 nm to 100 nm by plasma CVD at a temperature of the substrate of 150° C. to 450° C. Disilane or monosilane may be used as a source gas, for example. Then, the semiconductor film 1 is irradiated with a laser beam and is thereby annealed. As a result, the amorphous semiconductor film 1 is melted, cooled, solidified, and crystallized. In this case, the laser beam is applied to the regions, of which the area is limited with respect to the overall area of the substrate, for a significantly reduced period. Therefore, temperature of the substrate is not increased in the entire area thereof whereby deformation, cracks, or the like of the substrate 10' due to heat do not occur even when the substrate 10' is made of glass or the like.

A resist mask 551 is formed on the surface of the semiconductor film 1 by using a photolithography method. The semiconductor film 1 is etched via the resist mask 551, whereby the semiconductor film 1 is divided so that the island-like semiconductor films 1a (active layers) and the light-shielding films 1g which are respectively separate from each other are formed, as shown in FIG. 7(B).

A gate-insulation film 2, which is a silicon oxide film having a thickness of 50 nm to 150 nm, is formed on the surfaces of the semiconductor films 1a disposed on the entire substrate 10' by CVD or the like at a temperature of not higher than 350° C. In this case, a mixed gas of, for example, TEOS and oxygen gas may be used as a source gas. The gate-insulation film 2 may be a silicon nitride film instead of the silicon oxide film.

Lower electrodes to form the storage capacitors 60 with the capacitor lines 3b are formed by implanting impurity ions to the extending parts 1f of the semiconductor films 1a via a given resist masks A conductive film 3, which is an aluminum film, a tantalum film, a molybdenum film, or an alloyed film containing one of these metals as a major component, having a thickness of 300 nm to 800 nm is formed on the overall substrate 10' by sputtering or the like, and a resist mask 552 is formed, as shown in FIG. 7(C).

The conductive film 3 is dry-etched via the resist mask 552, and the scan lines 3a (gate electrodes), the capacitor lines 3b, and the like are formed.

Impurity ions (phosphorous ions) are implanted at a small dose amount of approximately $0.1 \times 10^{13}/cm^2$ to approximately $10 \times 10^{13}/cm^2$ into a pixel TFT section and an N-channel TFT section (not shown) of the driving circuits by using the scan lines 3a and the gate electrodes as a mask, and the lightly-doped source regions 1b and the lightly-doped drain regions 1c are thereby formed opposing the scan lines 3a in a self-aligned manner. Regions in which the impurity ions are not implanted because the regions are disposed directly under the scan lines 3a become the channel regions 1a'.

In the pixel TFT section, a resist mask 553 having an area larger than that of the scan lines 3a (gate electrode) is formed, and impurity ions (phosphorous ions) are implanted at a large dose amount of approximately $0.1 \times 10^{15}/cm^2$ to approximately $10 \times 10^{15}/cm^2$, thereby forming the heavily-doped source regions 1b and the heavily-doped drain regions 1d, as shown in FIG. 8(A).

In place of the impurity implantation processes described above, impurities (phosphorous ions) may be heavily implanted by using a resist mask having an area larger than that of the gate electrodes instead of lightly implanting impurities, thereby forming source regions and drain regions having offset structures. Self-alignment-type source regions and drain regions may be formed by heavily implanting impurities by using the scan lines 3a as masks.

When the N-channel TFT section of the peripheral driving-circuits is formed in the above processes, a P-channel TFT section is covered with a mask, which is omitted from the figures. When the P-channel TFT section of the peripheral driving circuits is formed, the pixel section and the N-channel TFT section are covered with a resist, and self-alignment-type source and drain regions are formed by implanting boron ions at a dose rate of approximately $0.1 \times 10^{15}/cm^2$ to approximately $10 \times 10^{15}/cm^2$ by using the gate electrodes as masks. In this case, source regions and drain regions having LDD (lightly-doped drain) structures may be formed by lightly implanting impurities (boron ions) at a dose amount of approximately $0.1 \times 10^{13}/cm^2$ to approximately $10 \times 10^{13}/cm^2$ by using the gate electrodes as masks in the same manner as in the N-channel TFT section and thereby forming lightly-doped regions on a polysilicon film, and heavily implanting impurities (boron ions) at a dose amount of approximately $0.1 \times 10^{15}/cm^2$ to approximately $10 \times 10^{15}/cm^2$ by using a mask having an area larger than that of the gate electrodes. Instead of lightly implanting impurities, impurities (phosphorous ions) may be heavily implanted by using a mask having an area larger than that of the gate electrodes, thereby forming source regions and drain regions having offset structures. Through these ion-implantation processes, CMOSs can be made and the peripheral driving circuits can be integrated in the same substrate.

As shown in FIG. 8(B), the first interlayer insulation film 4, which is a silicon film or the like having a thickness of 300 nm to 800 nm, is formed on the front faces of the scan lines 3a by CVD or the like. In this case, a mixed gas of TEOS and oxygen gas may be used as a source gas.

A resist mask 554 is formed by photolithography.

The contact holes are formed in the first interlayer insulation film 4 at the portions thereof corresponding to the source regions and the drain regions, as shown in FIG. 8(C), by dry-etching the first interlayer insulation film 4 via the resist mask 554.

As shown in FIG. 8(D), a conductive film 6, which is an aluminum film, a tantalum film, a molybdenum film, or an alloyed film including one of these metals as a major component having a thickness of 300 nm to 800 nm, is formed on the front face of the first interlayer insulation film 4, then, a resist mask 555 is formed by photolithography, the conductive film 6 being used to form the data lines 6a (source electrodes) and the like.

The conductive film 6 is dry-etched via the resist mask 555, thereby forming the data lines 6a and the drain electrodes 6b, as shown in FIG. 9(A).

In FIG. 9(B), the second interlayer insulation film 5, which is a silicon nitride film or an acrylic film having a thickness of 100 nm to 300 nm, is formed at the front face side of the data lines 6a and the drain electrodes 6b by CVD or the like, then, a resist mask 556 to form contact holes and the like in the second interlayer insulation film 5 is formed.

The second interlayer insulation film 5 is dry-etched via the resist mask 556, and the contact holes are thereby formed in the portions of the second interlayer insulation film 5 corresponding to drain electrodes 14, as shown in FIG. 9(C).

A photosensitive resin 13, such as an acrylic resin, is applied rather thick to the front face of the second interlayer insulation film 5, as shown in FIG. 10(A), and the photosensitive resin 13 is patterned by photolithography, whereby the projection-recess-forming resin layer 13a is partly left without being removed selectively to form a desired pattern in a region disposed at a level lower than the light-reflecting film 8a and planarly overlapping the light-reflecting film 8a (see FIG. 6), as shown in FIG. 10(B).

In an exposure process when the projection-recess-forming resin layer 13a is formed by photolithography, ultraviolet (UV) rays or the like are applied to the front face of the TFT-arrayed substrate 10 via the exposure mask 510 while the TFT-arrayed substrate 10 is adsorbed and held at the rear face thereof by the stage-shaped vacuum chuck 500 (substrate holder). The vacuum chuck 500 is provided with numerous suction holes 501. The TFT-arrayed substrate 10 is adsorbed at the suction holes 501 by evacuating the vacuum chuck 500.

Although in these processes, either a negative or positive type of photosensitive resin may be used as the photosensitive resin 13, the photosensitive resin 13 shown in FIG. 10(A) is a positive type, and ultraviolet rays are applied through openings 511 of the exposure mask 510 to portions from which the photosensitive resin 13 is removed. In such a case, a risk of marks of the suction holes 501 being transferred to the photosensitive resin 13 can be avoided by positioning the suction holes 501 of the vacuum chuck 500 at the regions in which the light-shielding films 1g are formed and the regions from which the light is intercepted by the exposure mask 510, whereby the ultraviolet rays are intercepted, when the photosensitive resin 13 is exposed, at least from the regions in which the suction holes 501 of the vacuum chuck 500 are formed.

When a negative-type photosensitive resin is used as the photosensitive resin 13, ultraviolet rays are only applied through the openings 511 of the exposure mask 510 to a portion of the photosensitive resin 13 which is left without being removed for the projection-recess-forming resin layer 13a and are not applied to the remaining portions, of which the description is omitted from the drawings. The light applied to the portions other than that corresponding to the projection-recess-forming resin layer 13a is intercepted from being transmitted through the TFT-arrayed substrate 10. Therefore, a risk of the light transmitted through the TFT-arrayed substrate 10 being reflected by the vacuum chuck 500, when the photosensitive resin 13 is exposed, and marks of the suction holes 501 thereby being transferred to the photosensitive resin 13, is avoided.

The light-shielding films 1g are formed substantially over the entire regions which planarly overlap the light-reflecting films 8a. Therefore, the difference of reflection between the regions provided with the light-shielding films 1g and the regions not provided with the light-shielding films 1g does not affect the result of the exposure.

A perhydropolysilazane or a material including the same is applied to the upper surfaces of the second interlayer insulation film 5 and the projection-recess-forming resin layer 13a and is sintered, or a fluid material 7, such as an acrylic resin, is applied to the upper surfaces of the second interlayer insulation film 5 and the projection-recess-forming resin layer 13a and is cured, as shown in FIG. 10(C), then, the upper insulation film 7a provided with contact holes are formed by photolithography, as shown in FIG. 10(D).

The perhydropolysilazane is an inorganic polysilazane and is a coat-type coating material which is transformed into a silicon oxide film by being sintered in the atmosphere. For example, the polysilazane made by TonenGeneral Sekiyu K.K. is an inorganic polymer containing —(SiH$_2$NH)— as a repeating unit, and is soluble in an organic solvent, such as xylene. Therefore, a solution of the inorganic polymer in an organic solvent (for example, a solution containing xylene of 20 percent) as an embrocation is applied by spin coating (for example, at 2000 rpm for 20 seconds), and is sintered at a temperature of 450° C. in the atmosphere, whereby a dense amorphous silicon oxide film having a quality that is not inferior to that of a silicon oxide film formed by CVD can be obtained.

The upper insulation film 7a is formed with a film coated with a fluid material. Therefore, the upper insulation film 7a is provided with a projection-recess pattern that is smoothly shaped and that has no edges with steps, recesses, projections, which are formed by the projection-recess-forming resin layer 13a, being appropriately absorbed As shown in FIG. 11(A), a resist mask 557 is formed by photolithography after a reflective metallic film 8, such as an aluminum film, is formed on the front face of the upper insulation film 7a by sputtering or the like.

The metallic film 8 is etched via the resist mask 557 and the light-reflecting films 8a are thereby left in given regions without being removed, as shown in FIG. 11(B). The light-reflecting films 8a thus formed are provided on the surfaces thereof with the projection-recess patterns 8g having a thickness of not smaller than 500 nm or not smaller than 800 nm formed by the steps, recesses, and projections that are formed by the projection-recess-forming resin layer 13a and in regions in which the projection-recess-forming resin layer 13a is not provided. The projection-recess patterns 8g have smooth surfaces without edges because the edges are absorbed by the upper insulation film 7a.

An ITO film 9 having a thickness of 40 nm to 200 nm is formed at the upper side of the light-reflecting films 8a and a resist mask 558 is formed by photolithography, as shown in FIG. 11(C).

The ITO film 9 is etched via the resist mask 558 and is formed as the pixel electrodes 9a which are each electrically connected to the drain electrode 6b, as shown in FIG. 11(D).

Then, a polyimide film (the orientation film 12) is formed in a given region at the front face side of the pixel electrodes 9a, as shown in FIG. 6, in such a manner that polyimide varnish, which is formed by dissolving polyimide or polyamide oxide of 5 to 10 weight percent in a solvent of butylcellosolve or n-methylpyrrolidone, is flexo-printed, and is heated to be cured (sintered). The substrate that is provided with the polyimide film is rubbed in a predetermined direction with buffing cloth of a rayon-based fabric, whereby polyimide molecules are oriented in the predetermined direction in the vicinity of the surface of the polyimide film. As a result, liquid crystal molecules that are to be subsequently loaded are oriented in a predetermined direction by an effect of the interaction between the liquid crystal molecules and the polyimide molecules.

Thus, the TFT-arrayed substrate 10 is completed. In the exposure process, described above with reference to FIG. 10(A), of the manufacturing processes, the light-shielding film 1g is formed in a given region at the lower side of the projection-recess-forming resin layer 13a before the projection-recess-forming resin layer 13a is formed, so that marks of the openings 511 are prevented by the light-shielding film 1g from being transferred to the photosensitive resin 13 with the light transmitted through the TFT-arrayed substrate 10, when the photosensitive resin 13 is exposed, being reflected by the vacuum chuck 500. Therefore, since the projection-recess-forming resin layer 13a can be formed accurately, the shapes of the projection-recess patterns 8g formed on the surfaces of the light-reflecting films 8a can be controlled accurately, whereby the electro-optical device 100 using the TFT-arrayed substrate 10 can perform high-quality display.

According to the present embodiment, the light-shielding film 1g is formed simultaneously with the semiconductor film 1a of the TFT 30. Therefore, no additional process is required even when the light-shielding 1g is additionally provided.

Modified Example of the First Embodiment

Figure 12:
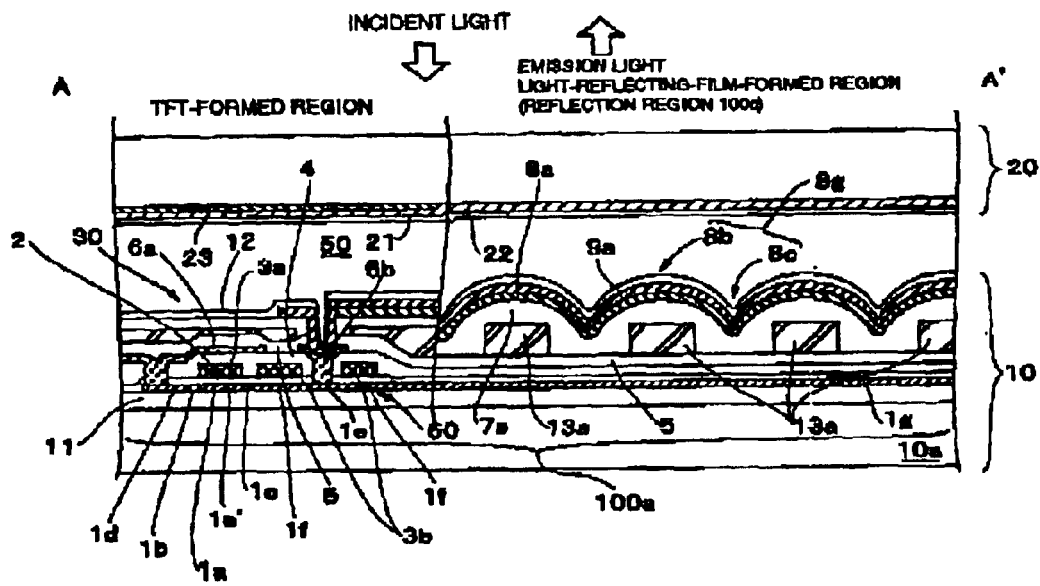
FIG. 12 is a sectional view of a part of a pixel of a modified example of the electro-optical device according to the first embodiment of the present invention, taken along a plane corresponding to plane A–A' shown in FIG. 4.

FIG. 12 is a sectional view of a part of a pixel of a modified example of the electro-optical device according to the first embodiment of the present invention, taken along a plane corresponding to plane A–A' shown in FIG. 4. The basic configuration of this example of the electro-optical device is substantially the same as that according to the first embodiment; therefore, components commonly used are shown in FIG. 12 by using the same reference numerals, of which the description is omitted.

According to the first embodiment, the light-shielding film 1g is formed at the same level as that of the semiconductor film 1a which serves as an active layer of the TFT 30 and the lower electrode of the storage capacitor 60, and is electrically separated from these components across the gaps 1". However, where there is no risk of forming capacitance with other conductive films or a short-circuit, the gaps 1" shown in FIG. 6 may be eliminated and the light-shielding film 1g may be extended from the semiconductor film 1a serving as an active layer of the TFT 30 or from the lower electrode of the storage capacitor 60, as shown in FIG. 12.

With this arrangement, the light-shielding film 1g of each pixel is electrically connected to the pixel electrode 9a via the drain region of the TFT 30. Therefore, deterioration of display due to the variation in potential of the light-shielding film 1g can be avoided because the potential of the light-shielding film 1g is fixed.

When the upper electrode (capacitor line 3b) of the storage capacitor 60 is extended in proportion to the extension of the lower electrode of the storage capacitor 60, the capacitance value of the storage capacitor 60 can be increased. In the thus arranged configuration, the increase of the capacitance value of the storage capacitor 60 does not cause a reduction of the amount of light contributing to the display, because the region of the storage capacitor 60 is disposed at the lower side of the light-reflecting film 8a in the reflection-display region.

Second Embodiment

Figure 13:
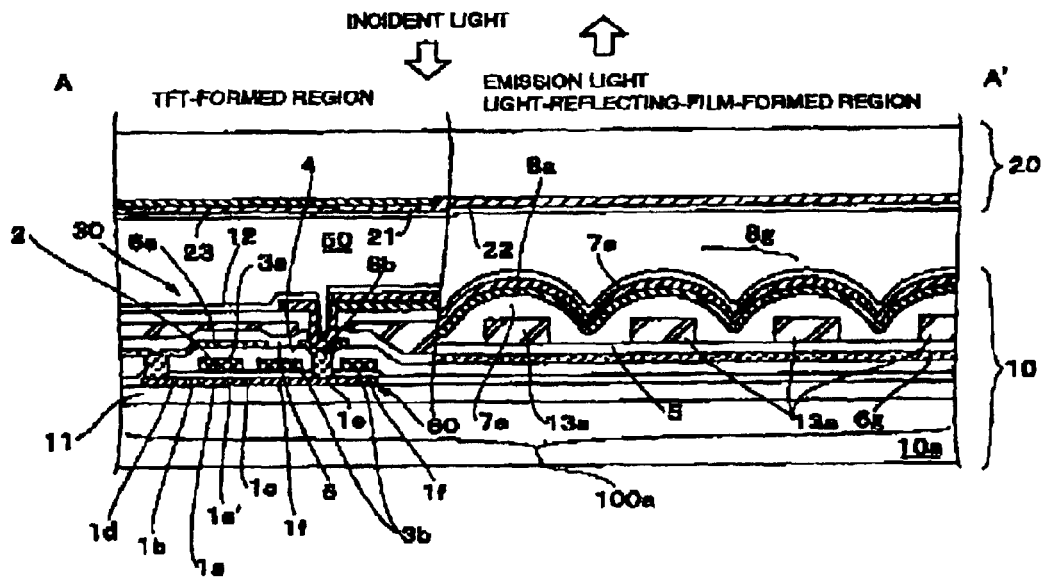
FIG. 13 is a sectional view of a part of a pixel of an electro-optical device according to a second embodiment of the present invention, taken along a plane corresponding to plane A–A' shown in FIG. 4.

FIG. 13 is a sectional view of a part of a pixel of an electro-optical device according to a second embodiment of the present invention, taken along a plane corresponding to plane A–A' shown in FIG. 4. The basic configuration of the electro-optical device according to this embodiment and embodiments described below is substantially the same as that according to the first embodiment; therefore, components commonly used are shown in the drawings by using the same reference numerals, of which the description is omitted.

Although according to the first embodiment, a semiconductor film disposed at the same level as the semiconductor film 1a is used as the light-shielding film 1g, a conductive film 6g disposed at the same level as a source electrode (the data line 6a) may be used as a light-shielding film, as shown in FIG. 13. In this case, the conductive film 6g used as a light-shielding film and the source electrode (data line 6a) are electrically separated from each other by ensuring a gap therebetween.

When the light-shielding film 6g is formed substantially over the entire region which planarly overlaps the light-reflecting film 8a, reflection at the region provided with the light-shielding film 6g and the reflection at the region not provided with the light-shielding film 6g do not affect the result of the exposure.

Modified Example of the Second Embodiment

Figure 14:
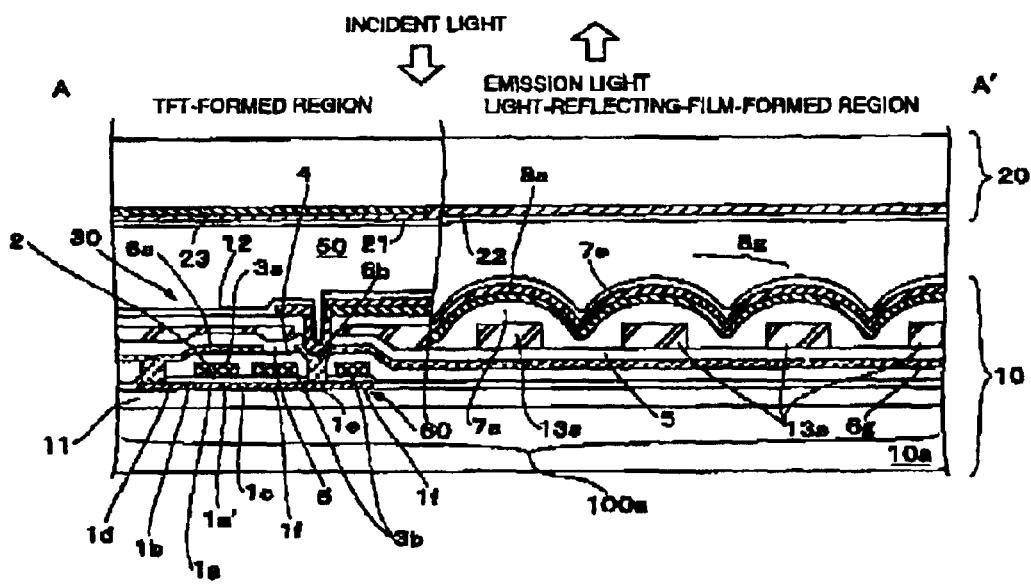
FIG. 14 is a sectional view of a part of a pixel of a modified example of the electro-optical device according to the second embodiment of the present invention, taken along a plane corresponding to plane A–A' shown in FIG. 4.

FIG. 14 is a sectional view of a part of a pixel of a modified example of the electro-optical device according to the second embodiment of the present invention, taken along a plane corresponding to plane A–A' shown in FIG. 4.

According to the second embodiment, the light-shielding film 6g is formed at the same level as the drain electrode 6b and is electrically separated from the drain electrode 6b. However, since the light-shielding film 6g is independent from the light-shielding films 6g of the other pixels, the light-shielding film 6g may be extended from the drain electrode 6b, as shown in FIG. 14, unless there is a risk of forming capacitance with other conductive films or a short-circuit.

In such a configuration, the light-shielding film 6g of each pixel is electrically connected to the pixel electrode 9a via the drain electrode 6b. Therefore, deterioration of display due to the variation in potential of the light-shielding film 6g can be avoided because the potential of the light-shielding film 6g is fixed.

Where there is no risk of the light-shielding film 6g forming capacitance with other conductive films or a short-circuit to other wirings occurring the light-shielding film 6g may be extended from a source electrode (data line 6a), which is omitted from the figures.

Third Embodiment

Figure 15:
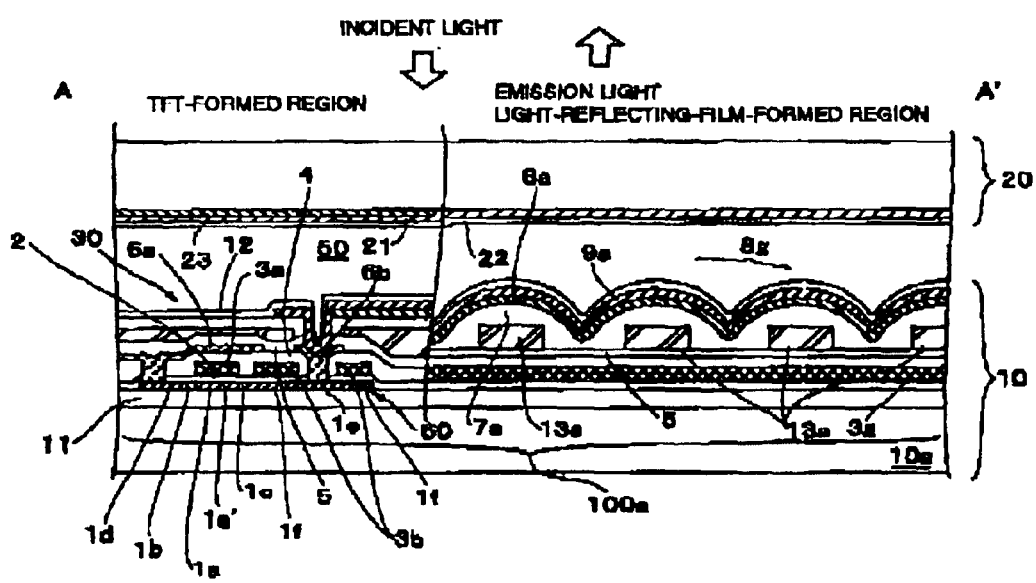
FIG. 15 is a sectional view of a part of a pixel of an electro-optical device according to a third embodiment of the present invention, taken along a plane corresponding to plane A–A' shown in FIG. 4.

FIG. 15 is a sectional view of a part of a pixel of an electro-optical device according to a third embodiment of the present invention, taken along a plane corresponding to plane A–A' shown in FIG. 4.

Although according to the first embodiment, a semiconductor film disposed at the same level as the semiconductor film 1a of each TFT 30 is used as the light-shielding film 1g, a conductive film 3g disposed at the same level as the gate electrode (scan line 3a) may be used as a light-shielding film. In this case, the light-shielding film 3g is disposed at the same level as the capacitor line 3b serving as the upper electrode of the storage capacitor 60. In such a configuration, a gap is ensured between the conductive film 3g as a light-shielding film and the gate electrode (scan line 3a), thereby electrically separating the conductive film 3g and the gate electrode from each other.

When the light-shielding film 3g is formed substantially over the entire region which planarly overlaps the light-reflecting film 3a, reflection at the region provided with the light-shielding film 3g and the reflection at the region not provided with the light-shielding film 3g do not affect the result of the exposure.

Where there is no risk of the light-shielding film 3g forming capacitance with other conductive films or a short-circuit to other wirings occurring, the light-shielding film 3g may be extended from the capacitor line 3b.

When the light-shielding film 3g is formed independent from those of the other pixels and there is no risk of forming capacitance with other conductive films or short-circuits, the light-shielding film 3g may be electrically connected to the pixel electrode 9a in each pixel directly via a contact hole or indirectly via another conductive film.

Fourth Embodiment

Figure 16:
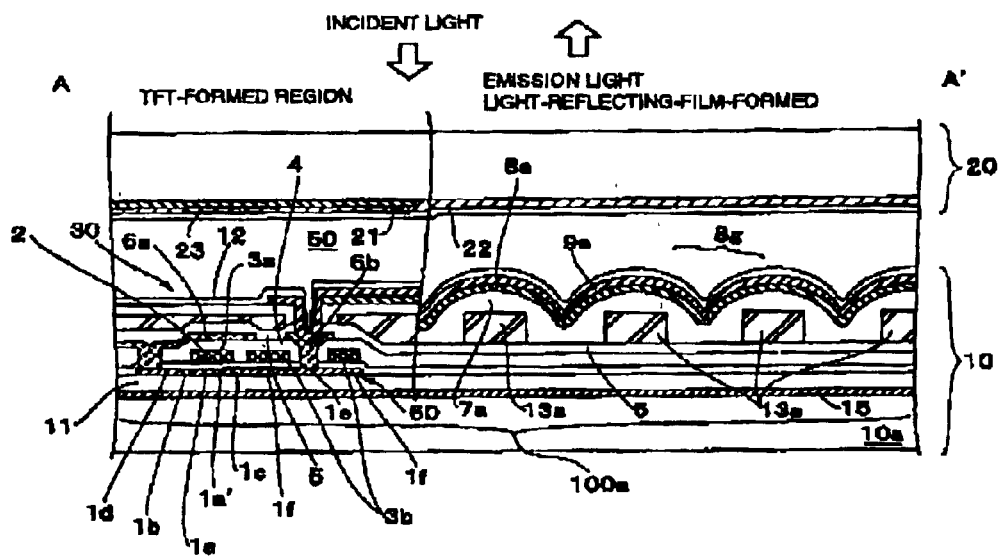
FIG. 16 is a sectional view of a part of a pixel of an electro-optical device according to a fourth embodiment of the present invention, taken along a plane corresponding to plane A–A' shown in FIG. 4.

FIG. 16 is a sectional view of a part of a pixel of an electro-optical device according to a fourth embodiment of the present invention, taken along a plane corresponding to plane A–A' shown in FIG. 4.

Although according to the first, second, and third embodiments, a light-shielding film is formed with a thin film disposed at the same level as the thin film which forms each TFT 30, a light-shielding film 15 is formed, according to the present embodiment, at the lower side of the primary protective-film 11. Since there is no risk of the thus arranged light-shielding film 15 short-circuiting to other conductive films, the light-shielding film 15 may be formed on the entire surface except the surface of the transmission region 100b.

When the light-shielding film 15 is formed independent from those of the other pixels, the light-shielding film 15 may be electrically connected to the pixel electrode 9a directly via a contact hole or indirectly via another conductive film.

Other Embodiments

Although according to the embodiments described above, the light-shielding film is formed as one layer, the light-shielding film may be used together with the light-shielding film according to the first to fourth embodiments.

Although according to the embodiments described above, the light-shielding film is formed in a region which is disposed at the lower side of the photosensitive resin layer and planarly overlaps the photosensitive resin layer, the light-shielding film may be formed in a region outside of the region planarly overlapping the photosensitive resin layer as long as the light-shielding film is disposed in a region which overlaps the suction holes 501 of the vacuum chuck 500.

Although according to the embodiments described above, an active-matrix liquid crystal device using TFTs as pixel-switching elements is used, the present invention is also applicable to an active-matrix liquid crystal device using TFDs as pixel-switching elements, a passive-matrix liquid crystal device, and an electro-optical device using an electro-optical material other than liquid crystal.

Application of Electro-Optical Device to Electronic Apparatus

The reflective or transflective electro-optical device 100 thus arranged can be used as a display for various electronic apparatuses, of which examples are described with reference to FIGS. 17, 18, and 19.

Figure 17:
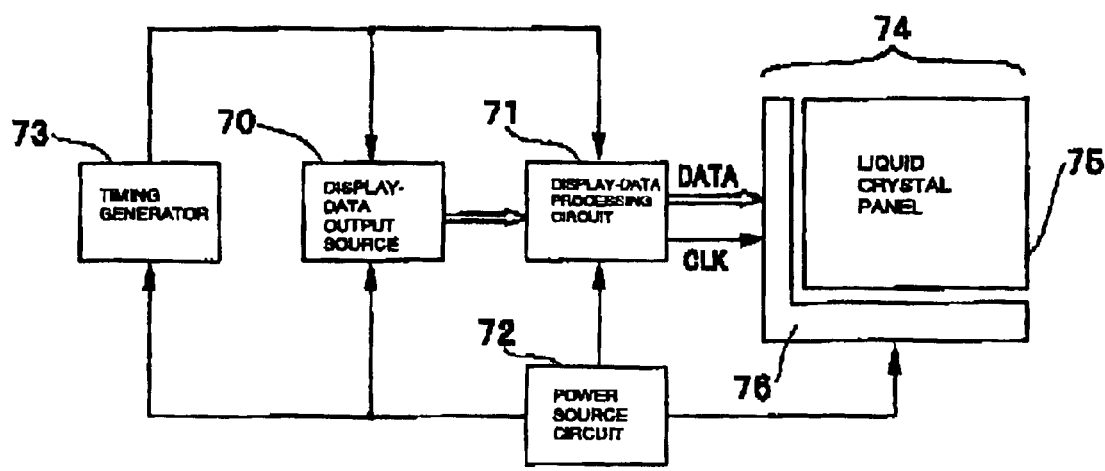
FIG. 17 is a schematic of circuitry of an electronic apparatus using an electro-optical device according to the present invention.

FIG. 17 is a schematic of circuitry of an electronic apparatus using an electro-optical device according to the present invention as a display.

In FIG. 17, the electronic apparatus includes a display-data output source 70, a display-data processing circuit 71, a power source circuit 72, a tiling generator 73, and a liquid crystal device 74. The liquid crystal device 74 includes a liquid-crystal display panel 75 and a driving circuit 76. The electro-optical device 100 described above is applicable to the liquid crystal device 74.

The display-data output source 70 includes storages, such as a ROM (read-only memory) and a RAM (random access memory), a storage unit, such as a unit including various types of disks, a tuning circuit to tune and output digital image signals, and the like. The display-data output source 70 supplies display data, such as image signals formed in a predetermined format, to the display-data processing circuit 71 in accordance with various types of clock signals generated by the timing generator 73.

The display-data processing circuit 71 includes various conventional circuits, such as a serial-parallel converting circuit, an amplification-inversion circuit, a rotation circuit, a gamma processing circuit, and a clamp circuit The display-data processing circuit 71 processes inputted display data, and supplies an image signal thereof to the driving circuit 76 together with a clock signal CLK. The power circuit 72 supplies a predetermined voltage to the components.

Figure 18:
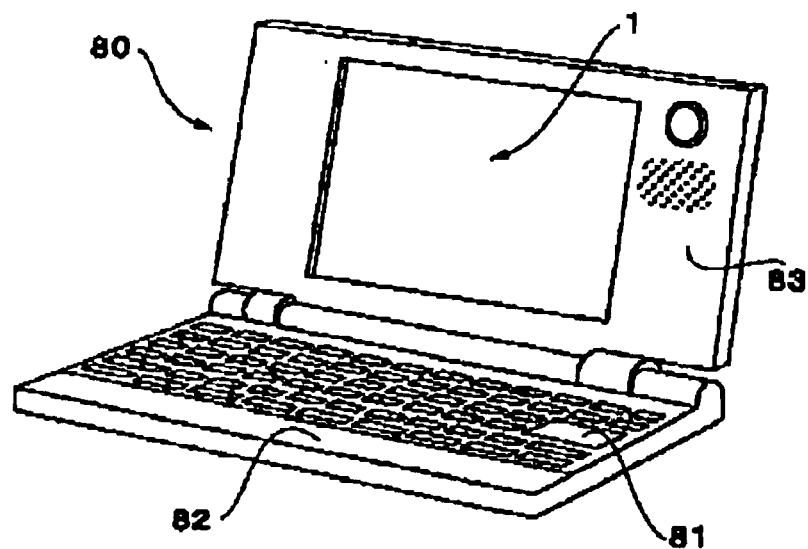
FIG. 18 is a perspective view of a mobile personal computer as an electronic apparatus according to an embodiment using an electro-optical device according to the present invention.

FIG. 18 is a perspective view of a mobile personal computer which is an electronic apparatus according to an embodiment of the present invention. A personal computer 80 shown in FIG. 18 includes a main body provided with a keyboard 81, and a liquid crystal display unit 83. The liquid crystal display unit 83 includes the electro-optical device 100 described above.

Figure 19:
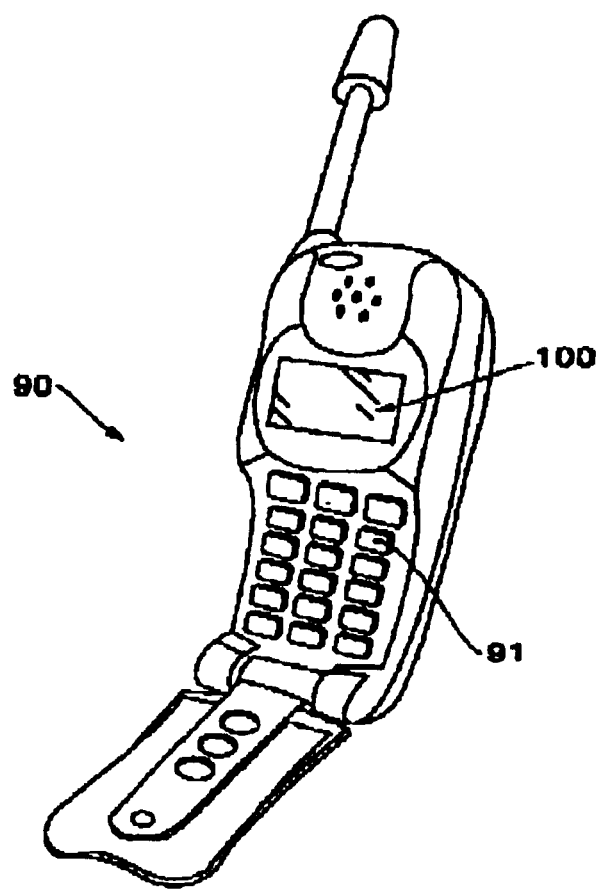
FIG. 19 is a perspective view of a cellular phone as an electronic apparatus according to another embodiment using an electro optical device according to the present invention.
Figure 21A:
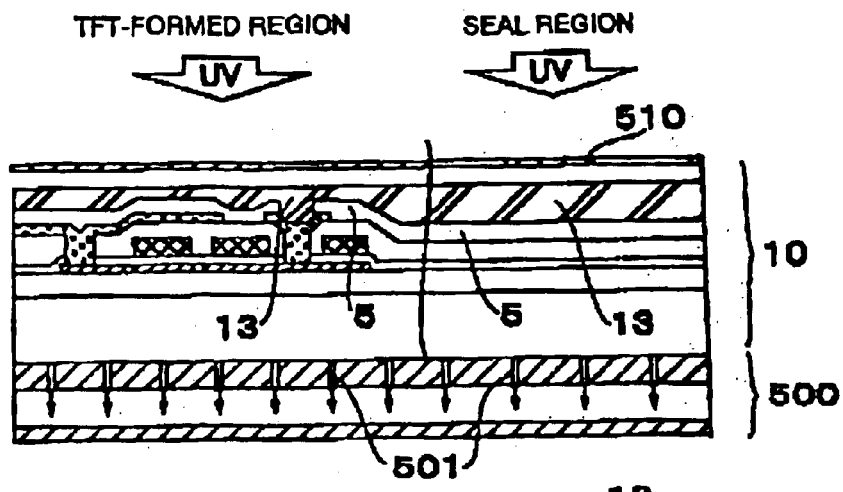
FIGS. 21(A)–21(D) are sectional views showing the steps of forming a projection-recess-forming resin layer and an upper insulation film in a known method for manufacturing an electro-optical device.
Figure 21B:
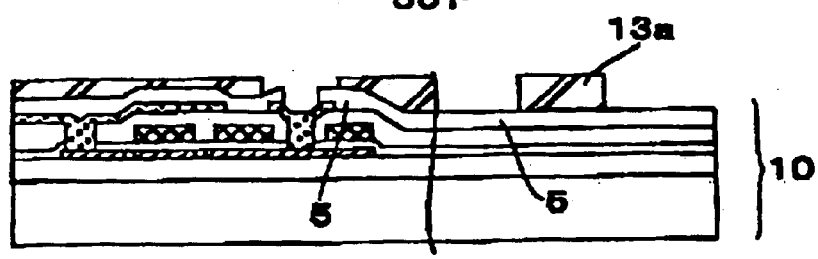
Figure 21C:
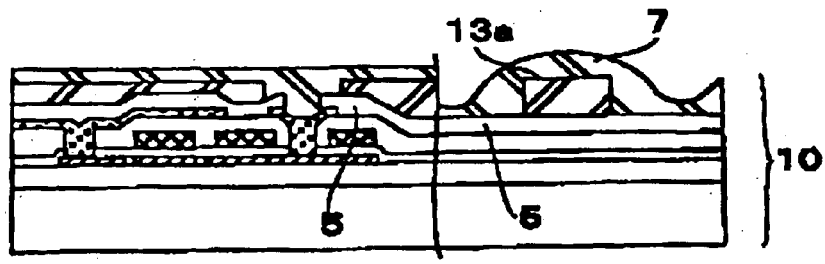
Figure 21D:
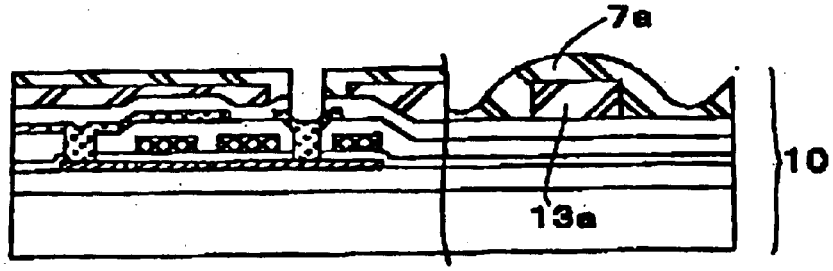

FIG. 19 is a schematic of a cellular phone which is an electronic apparatus according to another embodiment of the present invention. A cellular phone 90 shown in FIG. 19 includes a plurality of operation buttons 91 and a display which is the electro-optical device 100 described above.

Advantages

As described above, in order to form a photosensitive resin layer on a transparent substrate, the transparent substrate is coated at the front face thereof with a photosensitive resin, the photosensitive resin is exposed from the front face of the transparent substrate while the transparent substrate is held at the rear face thereof by a substrate holder, and development is performed In this case, the transparent substrate is provided with a light-shielding film that is formed at the lower side of the photosensitive resin layer. That is, when the photosensitive resin layer is formed on the transparent substrate, the light-shielding film has been formed at the lower side of the photosensitive resin layer. Therefore, a risk of light transmitted through the transparent substrate being reflected by the substrate holder and transferring marks or the like of the substrate holder to the photosensitive resin when the photosensitive resin is exposed is avoided, whereby the photosensitive resin layer can be formed accurately. Therefore, since the shape of a projection-recess pattern that is formed on a surface of a light-reflecting film is controlled accurately, high-quality display can be performed.

What is claimed is:

1. An electro-optical device with a plurality of pixels arrayed in a matrix, the electro-optical device comprising:
   an electro-optical material; and
   a transparent substrate that holds the electro-optical material, each of the pixels including a first region in which a thin-film transistor is formed and a second region in which a light reflecting film is formed, the second region including a photosensitive resin layer which defines projections and recesses formed in a predetermined disposition pattern, the second region also including the light-reflecting film which is formed at an upper side of the photosensitive resin layer and in a region planarly overlapping the photosensitive resin layer, the light-reflecting film being provided at a surface thereof with projections and recesses corresponding to the disposition pattern of the photosensitive resin layer, the second region also including a light-shielding film at a lower side of the photosensitive resin layer and in a region planarly overlapping at least a region of the photosensitive resin layer in which the projections and recesses are formed.

2. The electro-optical device according to claim 1, the light-shielding film being formed substantially over an entire region which planarly overlaps the second region in which the light-reflecting film is formed.

3. The electro-optical device according to claim 1, the transparent substrate being provided with the pixels arrayed in a matrix, each pixel including a thin-film element formed with a plurality of thin-film layers and a transparent pixel electrode electrically connected to the thin-film element; and
   the light-shielding film being formed at the same level as one of the plurality of thin-film layers.

4. The electro-optical device according to claim 3, the thin-film element including the thin-film transistor formed on the transparent substrate; and
   the light-shielding film being formed at the same level as one of a semiconductor film formed at the same level as an active layer of the thin-film transistor, a conductive film formed at the same level as a gate electrode of the thin-film transistor, and another conductive film formed at the same level as a source electrode of the thin-film transistor.

5. The electro-optical device according to claim 3, the thin-film element including the thin-film transistor formed on the transparent substrate; and
   the light-shielding film being formed at the same level as, and electrically separated from, one of a semiconductor film formed at the same level as an active layer of the thin-film transistor, a conductive film formed at the same level as a gate electrode of the thin-film transistor, and another conductive film formed at the same level as a source electrode of the thin-film transistor.

6. The electro-optical device according to claim 3, the thin-film element including the thin-film transistor formed on the transparent substrate; and
   the light-shielding film being formed integrally with one of a semiconductor film formed at the same level as an active layer of the thin-film transistor, a conductive film formed at the same level as a gate electrode of the thin-film transistor, and another conductive film formed at the same level as a source electrode of the thin-film transistor.

7. The electro-optical device according to claim 3, the thin-film element including a storage capacitor formed on the transparent substrate; and
   the light-shielding film being formed with a conductive film disposed at the same level as one of a lower electrode and an upper electrode of the storage capacitor.

8. The electro-optical device according to claim 3, the thin-film element including a storage capacitor formed on the transparent substrate; and
   the light-shielding film being formed with a conductive film disposed at the same level as and electrically separated from one of a lower electrode and an upper electrode of the storage capacitor.

9. The electro-optical device according to claim 3, the thin-film element including a storage capacitor formed on the transparent substrate; and
   the light-shielding film being formed with a conductive film which is formed integrally with one of a lower electrode and an upper electrode of the storage capacitor.

10. The electro-optical device according to claim 3, a primary protective-film being formed on the transparent substrate at a lower side of the thin-film element, and the light-shielding film being formed at a lower side of the primary protective-film.

11. The electro-optical device according to claim 3, the light-shielding film being electrically separated from the pixel electrode.

12. The electro-optical device according to claim 3, the light-shielding film included in each pixel being formed independently from the light-shielding films included in the other pixels, and being electrically connected to the pixel electrode in each pixel.

13. The electro-optical device according to claim 1, the second region of each pixel formed on the transparent substrate including a reflection region in which light incident from a front face side of the transparent substrate is reflected by the light-reflecting film, and a transmission region in which the light incident from a rear face side of the transparent substrate is transmitted to the front face side thereof; and the light-shielding film being formed in the reflection region.

14. The electro-optical device according to claim 1, the transparent substrate including a first transparent substrate, and the first transparent substrate opposing a second transparent substrate, liquid crystal as an electro-optical material being held between the first and second transparent substrates.

15. An electronic apparatus, comprising:
    the electro-optical device according to claim 1.

16. A method for manufacturing an electro-optical device which includes a transparent substrate that holds an electro-optical material, the transparent substrate including a photosensitive resin layer which defines projections and recesses formed in a predetermined disposition pattern, the transparent substrate also including a light-reflecting film which is formed at an upper side of the photosensitive resin layer and in a region planarly overlapping the photosensitive resin layer, the light-reflecting film being provided on a surface thereof with projections and recesses corresponding to the disposition pattern of the photosensitive resin layer, the method comprising:

forming a light-shielding film in a predetermined region at a lower side of the photosensitive resin layer before forming the photosensitive resin layer on the transparent substrate; and forming the photosensitive resin layer on the transparent substrate by applying a photosensitive resin to the transparent substrate at a front face thereof, then, exposing the photosensitive resin from the front face of the transparent substrate while holding the transparent substrate with a substrate holder at a rear face of the transparent substrate, the light-shielding film shielding light reflected from the substrate holder from reaching the photosensitive resin under exposure.

17. A method for manufacturing an electro-optical device which includes a transparent substrate that holds an electro-optical material, the transparent substrate including a photosensitive resin layer which defines projections and recesses formed in a predetermined disposition pattern, the transparent substrate also including a light-reflecting film which is formed at an upper side of the photosensitive resin layer and in a region planarly overlapping the photosensitive resin layer, the light-reflecting film being provided on a surface thereof with projections and recesses corresponding to the disposition pattern of the photosensitive resin layer, the method comprising:

forming a light-shielding film in a predetermined region at a lower side of the photosensitive resin layer before forming the photosensitive resin layer on the transparent substrate; and forming the photosensitive resin layer on the transparent substrate by applying a photosensitive resin to the transparent substrate at a front face thereof, then, exposing the photosensitive resin from the front face of the transparent substrate while holding the transparent substrate with a substrate holder at a rear face of the transparent substrate, the substrate holder holding the transparent substrate at a region disposed at the rear face thereof, in which the light-shielding film is formed and which is shielded from light by an exposure mask.

18. A method for manufacturing an electro-optical device which includes a transparent substrate that holds an electro-optical material, the transparent substrate including a photosensitive resin layer which defines projections and recesses formed in a predetermined disposition pattern, the transparent substrate also including a light-reflecting film which is formed at an upper side of the photosensitive resin layer and in a region planarly overlapping the photosensitive resin layer, the light-reflecting film being provided on a surface thereof with projections and recesses corresponding to the disposition pattern of the photosensitive resin layer, the method comprising:

forming a light-shielding film in a predetermined region at a lower side of the photosensitive resin layer before forming the photosensitive resin layer on the transparent substrate; and forming the photosensitive resin layer on the transparent substrate by applying a photosensitive resin to the transparent substrate at a front face thereof, then, exposing the photosensitive resin from the front face of the transparent substrate while holding the transparent substrate with a substrate holder at a rear face of the transparent substrate, the substrate holder including a vacuum chuck which is provided with suction holes to adsorb the transparent substrate at the rear face thereof.

19. The method for manufacturing an electro-optical device according to claim 18, further including:

forming a thin-film element on the transparent substrate by performing thin-film deposition and patterning a plurality of times; and forming the light-shielding film on the transparent substrate in the step of forming the thin-film element.

* * * * *